(12) United States Patent
Kahen et al.

(10) Patent No.: US 6,876,684 B2
(45) Date of Patent: *Apr. 5, 2005

(54) ORGANIC VERTICAL CAVITY LASING DEVICE HAVING ORGANIC ACTIVE REGION

(75) Inventors: Keith B. Kahen, Rochester, NY (US); J. Ramon Vargas, Webster, NY (US); Denis Y. Kondakov, Kendall, NY (US); Christopher T. Brown, Rochester, NY (US); Lelia Cosimbescu, Rochester, NY (US); Viktor Jarikov, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 10/269,652

(22) Filed: Oct. 11, 2002

(65) Prior Publication Data

US 2003/0161368 A1 Aug. 28, 2003

(51) Int. Cl.$^7$ .............................. H01S 3/14; H01S 3/20; H01S 3/09; H01S 3/091
(52) U.S. Cl. .............................. 372/39; 372/53; 372/69; 372/70
(58) Field of Search .............................. 372/39, 45, 46, 372/49, 50, 53, 69, 70, 96, 99, 7, 92; 257/40; 359/273

(56) References Cited

U.S. PATENT DOCUMENTS

| | | | | |
|---|---|---|---|---|
| 3,731,222 A | * | 5/1973 | Drexhage | 372/53 |
| 3,781,711 A | * | 12/1973 | Drexhage et al. | 372/53 |
| 3,857,793 A | * | 12/1974 | Pappalardo et al. | 252/301.17 |
| 4,158,822 A | * | 6/1979 | Wan | 372/51 |
| 4,847,359 A | * | 7/1989 | Pfeifer et al. | 528/353 |

(Continued)

FOREIGN PATENT DOCUMENTS

| | | |
|---|---|---|
| EP | 1333549 | 8/2003 |
| EP | 1391943 | 2/2004 |
| JP | 2001-273977 | * 10/2001 |

OTHER PUBLICATIONS

Xie et al, Transient electroluminescence of organic quantum–well lingth–emitting diodes, Feb. 25, 2002, Applied Physics Letters, vol. 80, No. 8, pp. 1477–1479.*

"Coherent beams from high efficiency two–dimensional surface–emitting semiconductor laser arrays"; P.L. Gourley et al; Appl. Phys. Lett. 58 (9), Mar. 4, 1991; pp. 890–892.

" Light amplification in organic thin films using cascade energy transfer"; M. Berggren et al.; Nature vol. 389; Oct. 2, 1997; pp. 466–469.

"Design of Fabry–Perot Surface–Emitting Lasers with a Periodic Gain Structure"; Scott Corzine et al.; IEEE Journal of Quantum Electronics, vol. 25, No. 6; Jun. 1989; pp. 1513–1524.

(Continued)

*Primary Examiner*—Minsun Oh Harvey
*Assistant Examiner*—Armando Rodriguez
(74) *Attorney, Agent, or Firm*—Raymond L. Owens

(57) ABSTRACT

An organic vertical cavity laser light producing device includes a bottom dielectric stack reflective to light over a predetermined range of wavelengths; an organic active region for producing laser light, and having an organic active region including emissive material; and a top dielectric stack spaced from the bottom dielectric stack and reflective to light over a predetermined range of wavelengths. Pump-beam light is transmitted and introduced into the organic active region through at least one of the dielectric stacks. The organic active region includes one or more periodic gain region(s) and organic spacer layers disposed on either side of the periodic gain region(s) and arranged so that the periodic gain region(s) is aligned with the antinodes of the device's standing wave electromagnetic field, and wherein the spacer layers are substantially transparent to the laser light.

49 Claims, 25 Drawing Sheets

U.S. PATENT DOCUMENTS

| | | | |
|---|---|---|---|
| 4,873,696 A | | 10/1989 | Coldren et al. |
| 4,881,236 A | | 11/1989 | Brueck et al. |
| 5,086,430 A | | 2/1992 | Kapon et al. ................. 372/50 |
| 5,121,029 A | * | 6/1992 | Hosokawa et al. .......... 313/504 |
| 5,307,363 A | * | 4/1994 | Hosokawa et al. ............ 372/53 |
| 5,331,658 A | * | 7/1994 | Shieh et al. ................... 372/50 |
| 5,674,636 A | | 10/1997 | Miller et al. |
| 5,726,805 A | | 3/1998 | Kaushik et al. ............. 359/589 |
| 5,881,083 A | * | 3/1999 | Diaz-Garcia et al. .......... 372/39 |
| 5,908,581 A | * | 6/1999 | Chen et al. ............ 252/301.16 |
| 5,935,721 A | * | 8/1999 | Shi et al. ..................... 428/690 |
| 5,989,737 A | | 11/1999 | Hu et al. |
| 6,160,828 A | * | 12/2000 | Kozlov et al. ................ 372/39 |
| 6,194,119 B1 | | 2/2001 | Wolk et al. ................. 430/200 |
| 6,294,245 B1 | * | 9/2001 | Roitman et al. ............ 428/212 |
| 6,444,333 B1 | | 9/2002 | Asanuma et al. |
| 6,565,996 B2 | * | 5/2003 | Hatwar et al. .............. 428/690 |
| 6,631,147 B2 | * | 10/2003 | Taniguchi et al. ............ 372/39 |
| 6,687,274 B2 | * | 2/2004 | Kahen ......................... 372/39 |

OTHER PUBLICATIONS

Corzine et al, Design of Fabry–Perot Surface Emitting Lasers with a Periodic Gain Structure, IEEE J. of Quantum Eelctronics Jun 25, 1989 No. 6, pp. 1513–1524.

Gourley et al, High–efficiency TEMoo continuous wave (Al,Ga)As epitaxial surface–emitting lasers and effect of half–wave periodic gain, Appl. Phys. Lett. 54(1989), No. 13, pp. 1209–1211.

Kalinowski et al, Unusual disparity in electroluminescence and photoluminescense spectra of vaccum–evaporated films of 1,1 bis ((di–4–tolylamino) phenyl) cyclohexane, Appl. Phys. Letters. vol. 76, No. 17, 2000, pp. 2352–2354.

McGehee et al, Semiconducting polymer distributed feedback lasers, Appl. Phys. Lett. vol. 72, No. 13, 1998, pp. 1536–1538.

K. Kinoshita et al., IEEE J. Quant. Electron. QE–23, 882, 1987.

K.D. Choquette et al., Proc. IEEE 85, 1730, 1997.

C. Wilmsen et al., *Vertical–Cavity Surface–Emitting Lasers*, Cambridge University Press, Cambridge, 2001.

T. Ishigure et al., Electron. Lett. 31, 467, 1995.

P.L. Gourley et al., Appl. Phys. Lett. 54, 1209, 1989.

N. Tessler et al., Appl. Phys. Lett. 74, 2764, 1999.

* cited by examiner

ORGANIC VERTICAL CAVITY LASING DEVICE HAVING ORGANIC ACTIVE REGION

CROSS-REFERENCE TO RELATED APPLICATION

Reference is made to commonly assigned U.S. patent application Ser. No. 10/066,936 filed Feb. 4, 2002 by Keith B. Kahen et al., entitled "Organic Vertical Cavity Lasing Devices Containing Periodic Gain Regions", the disclosure of which is incorporated herein by reference.

FIELD OF INVENTION

This invention relates to the field of light-emitting devices. More specifically, this invention relates to organic-based solid-state lasers.

BACKGROUND OF THE INVENTION

Vertical cavity surface emitting lasers (VCSELs) based on inorganic semiconductors (e.g., AlGaAs) have been developed since the mid-80's (K. Kinoshita et al., IEEE J. Quant. Electron. QE-23, 882, 1987). They have reached the point where AlGaAs-based VCSELs emitting at 850 nm are manufactured by a number of companies and have lifetimes beyond 100 years (K. D. Choquette et al., Proc. IEEE 85, 1730, 1997). With the success of these near-infrared lasers in recent years, attention has turned to other inorganic material systems to produce VCSELs emitting in the visible wavelength range (C. Wilmsen et al., *Vertical-Cavity Surface-Emitting Lasers*, Cambridge University Press, Cambridge, 2001). There are many fruitful applications for visible lasers, such as display, optical storage reading/writing, laser printing, and short-haul telecommunications employing plastic optical fibers (T. Ishigure et al., Electron. Lett. 31, 467, 1995). In spite of the worldwide efforts of many industrial and academic laboratories, much work remains to create viable laser diodes (either edge emitters or VCSELs) which span the visible spectrum.

In the effort to produce visible wavelength VCSELs, it would be advantageous to abandon inorganic-based systems and focus on organic-based laser systems. Organic materials have properties making them suitable for gain media in these lasers, such as low scattering/absorption losses and high quantum efficiencies. Organic lasers offer the advantage over inorganic systems in that they are relatively inexpensive to manufacture and can be made to emit over the entire visible range.

The usual route for making a manufacturable laser diode system is to use electrical injection rather than optical pumping to create the necessary population inversion in the active region of the device. This is the case for inorganic systems, since their optically pumped thresholds for broad-area devices are on the order of $10^4$ W/cm$^2$ (P. L. Gourley et al., Appl. Phys. Lett. 54, 1209, 1989). Such high power densities can only be obtained by using other lasers as the pump sources, precluding that route for inorganic laser cavities. Unpumped organic laser systems have greatly reduced combined scattering/absorption loss (~0.5 cm$^{-1}$) at the lasing wavelength, especially if a host-dopant combination is used as the active media. As a result, optically pumped power thresholds below 1 W/cm$^2$ should be attainable, especially when a VCSEL-based microcavity design is employed in order to minimize the active volume (which results in lower thresholds). At these threshold power levels it becomes possible to optically pump organic-based vertical laser cavities using incoherent light-emitting diodes (LEDs). This result is highly significant for amorphous organic laser systems, since driving them by electrical injection has, to this date, been unobtainable mainly as a result of the low carrier mobility of organic materials (N. Tessler et al., Appl. Phys. Lett. 74, 2764, 1999).

SUMMARY OF THE INVENTION

It is an object of this invention to provide an organic surface emitting laser arrangement that is particularly suitable to permitting optimization of the organic active region, improving power conversion efficiency, and removing unwanted parasitic spontaneous emission.

These objects are achieved by an organic vertical cavity laser light producing device, comprising:

a) a bottom dielectric stack reflective to light over a predetermined range of wavelengths;

b) an organic active region for producing laser light, and having an organic active region including emissive material;

c) a top dielectric stack spaced from the bottom dielectric stack and reflective to light over a predetermined range of wavelengths;

d) wherein pump-beam light is transmitted and introduced into the organic active region through at least one of the dielectric stacks; and e) the organic active region includes one or more periodic gain region(s) and organic spacer layers disposed on either side of the periodic gain region(s) and arranged so that the periodic gain region(s) is aligned with the antinodes of the device's standing wave electromagnetic field, and wherein the spacer layers are substantially transparent to the laser light.

ADVANTAGES

It is an advantage of the present invention to improve the operation of a vertical cavity laser design incorporating high reflectance top and bottom dielectric stacks, having gain regions including either small-molecular weight organic material or polymeric material, with the gain region(s) placed at the antinodes of the standing wave electric field of the laser. As a result, the power conversion efficiency is improved, and unwanted output due to spontaneous emission is significantly reduced.

DETAILED DESCRIPTION OF THE INVENTION

Figure 1:
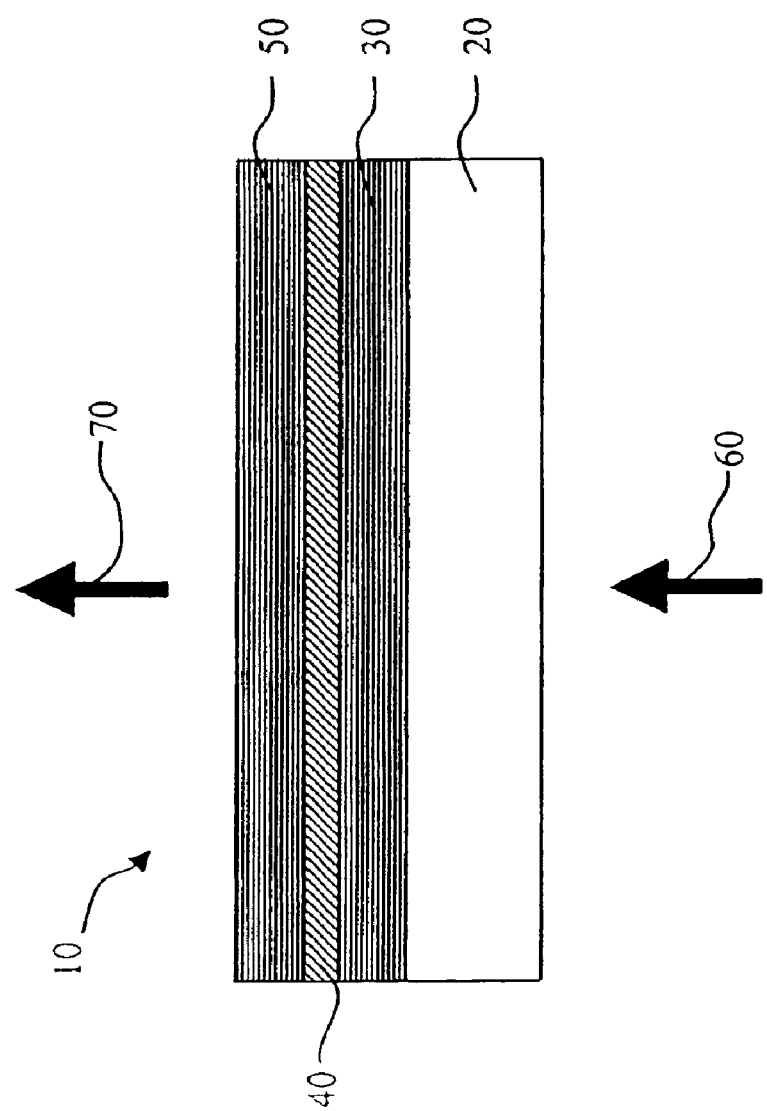
FIG. 1 shows a side view schematic of an optically pumped organic-based vertical cavity laser according to the present invention.

A schematic of a vertical cavity organic laser structure 10 is shown in FIG. 1. The substrate 20 can either be light transmissive or opaque, depending on the intended direction of optical pumping and laser emission. Light transmissive substrates 20 may be transparent glass or plastic. Alternatively, opaque substrates including, but not limited to, semiconductor material (e.g. silicon) or ceramic material may be used in the case where both optical pumping and emission occur through the same surface. On the substrate is deposited a bottom dielectric stack 30 followed by an organic active region 40. A top dielectric stack 50 is then deposited. A pump-beam 60 optically pumps the vertical cavity organic laser structure 10 through the substrate 20 and the bottom dielectric stack 30 and is mainly absorbed by the organic active region 40. The source of the pump-beam may be incoherent, such as, emission from a light-emitting diode (LED). Alternatively, the pump-beam may originate from a coherent laser source. FIG. 1 shows laser emission 70 from the top dielectric stack 50. Alternatively, the laser structure could be optically pumped through the top dielectric stack 50 with the laser emission through the substrate 20 by proper design of the dielectric stack reflectivities. In the case of an opaque substrate, such as silicon, both optical pumping and laser emission occur through the top dielectric stack 50.

The bottom and top dielectric stacks 30 and 50 are preferably deposited by conventional electron-beam deposition and are composed of alternating high index and low index dielectric materials, such as, $TiO_2$ and $SiO_2$, respectively. Other materials, such as $Ta_2O_5$ for the high index layers, could be used. The bottom dielectric stack 30 is deposited at a temperature of approximately 240° C. During the top dielectric stack 50 deposition process, the temperature is maintained at around 70° C. to avoid melting the organic active materials. In an alternative embodiment of the present invention, the top dielectric stack is replaced by the deposition of a reflective metal mirror layer. Typical metals are silver or aluminum, which have reflectivities in excess of 90%. In this alternative embodiment, both the pump-beam 60 and the laser emission 70 would proceed through the substrate 20. Both the bottom dielectric stack 30 and the top dielectric stack 50 are reflective to laser light over a predetermined range of wavelengths. It has been found by experimentation that in order to obtain lasing peaks with full widths at half-maximum (FWHM) less than 1 nm, it is necessary to have the reflectances of both the top and bottom dielectric stacks be greater than ~99% at the laser emission wavelength.

Figure 2:
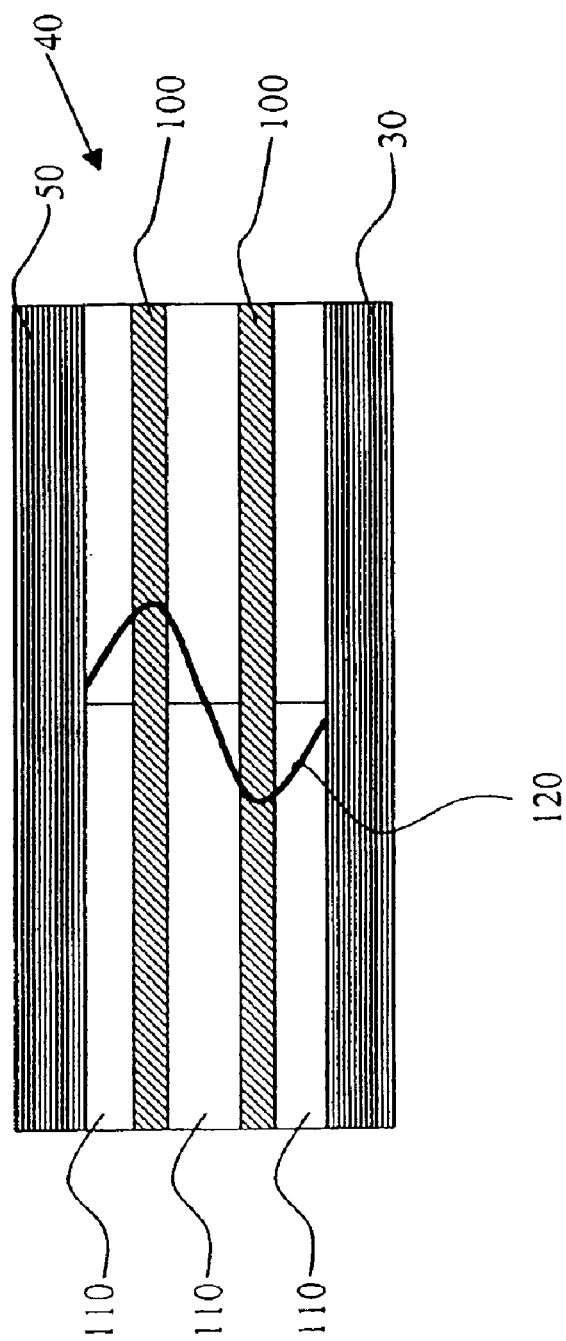
FIG. 2 is a side view schematic of an optically pumped organic-based vertical cavity laser showing gain region placement within the active region according to the present invention.
Figure 3:
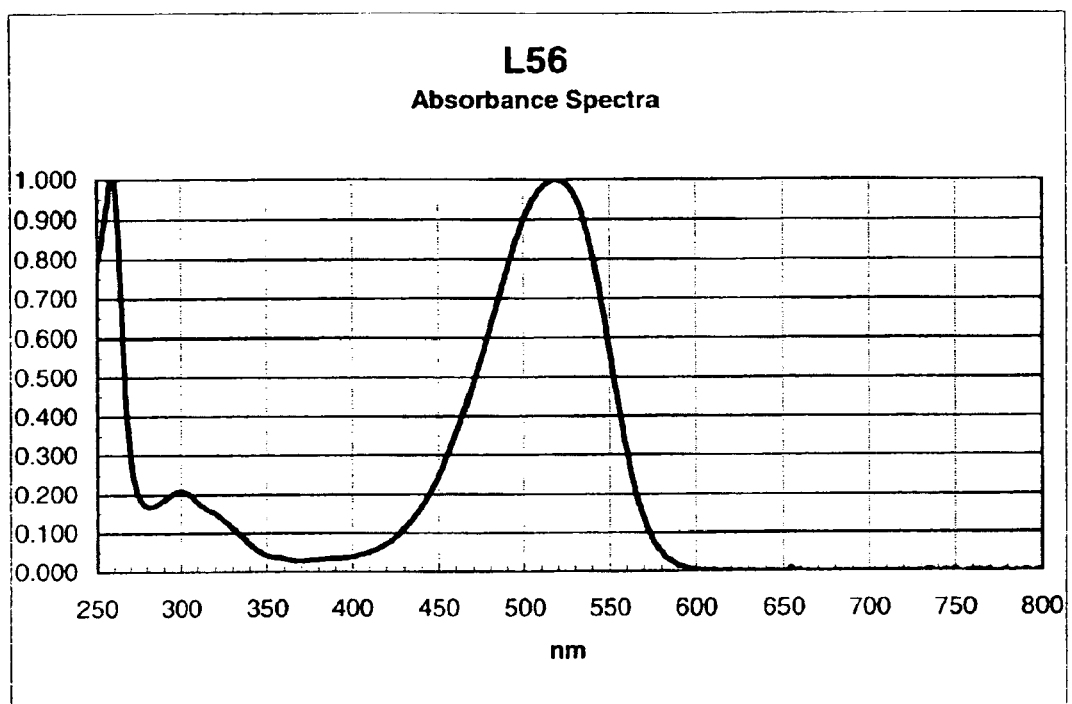
FIGS. 3–46 are graphs of absorption emission spectra for various host and dopant materials that can be used in accordance with the present invention.
Figure 4:
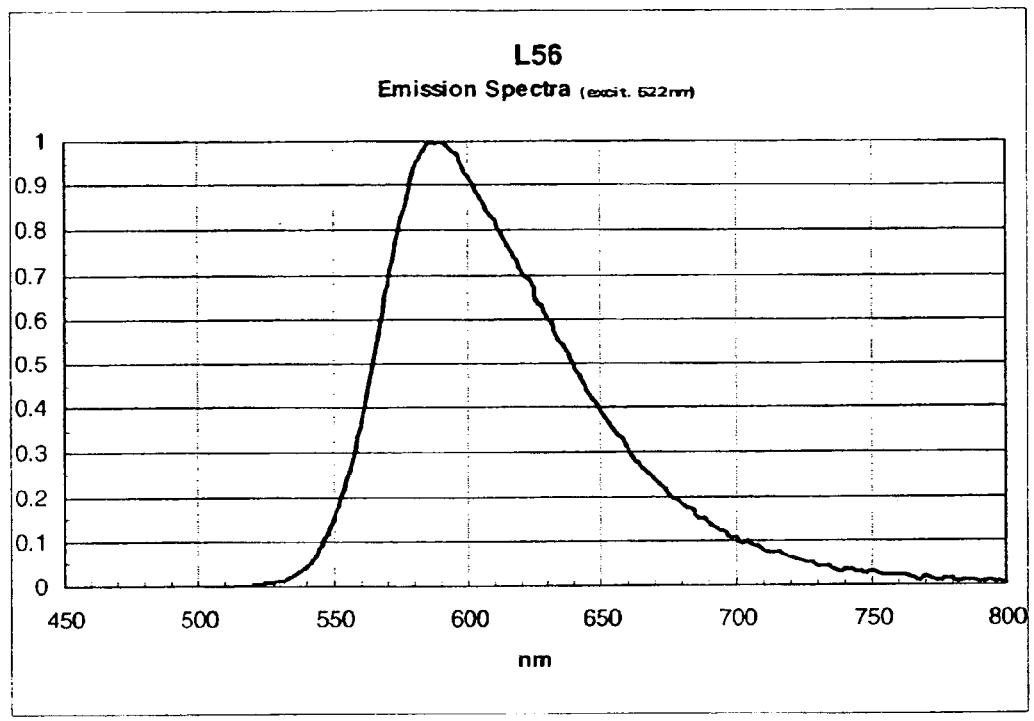
Figure 5:
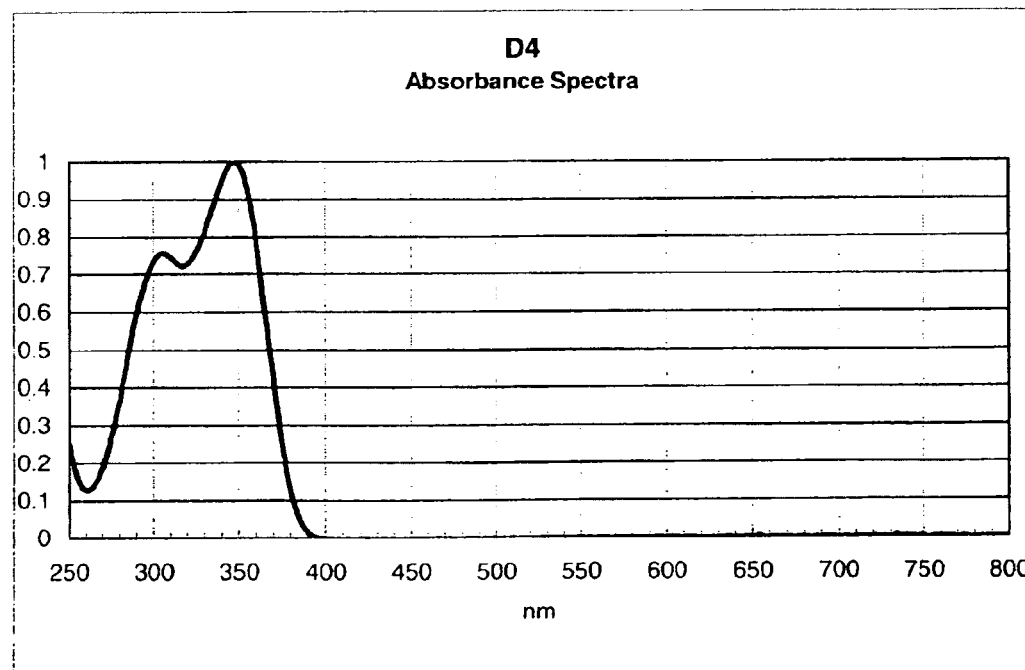
Figure 6:
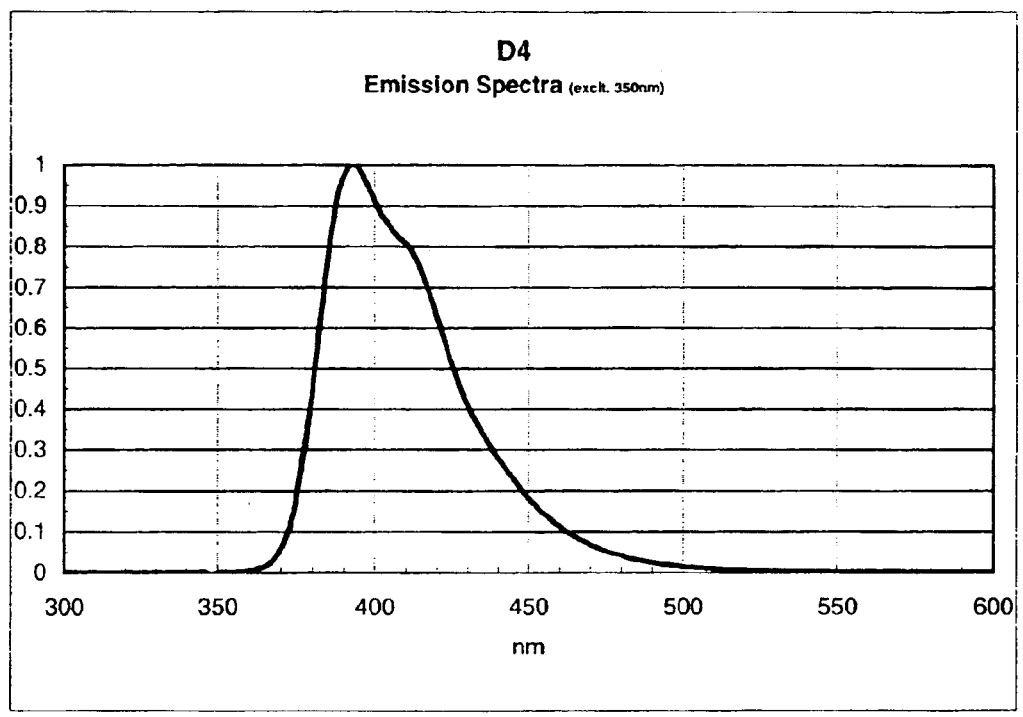
Figure 7:
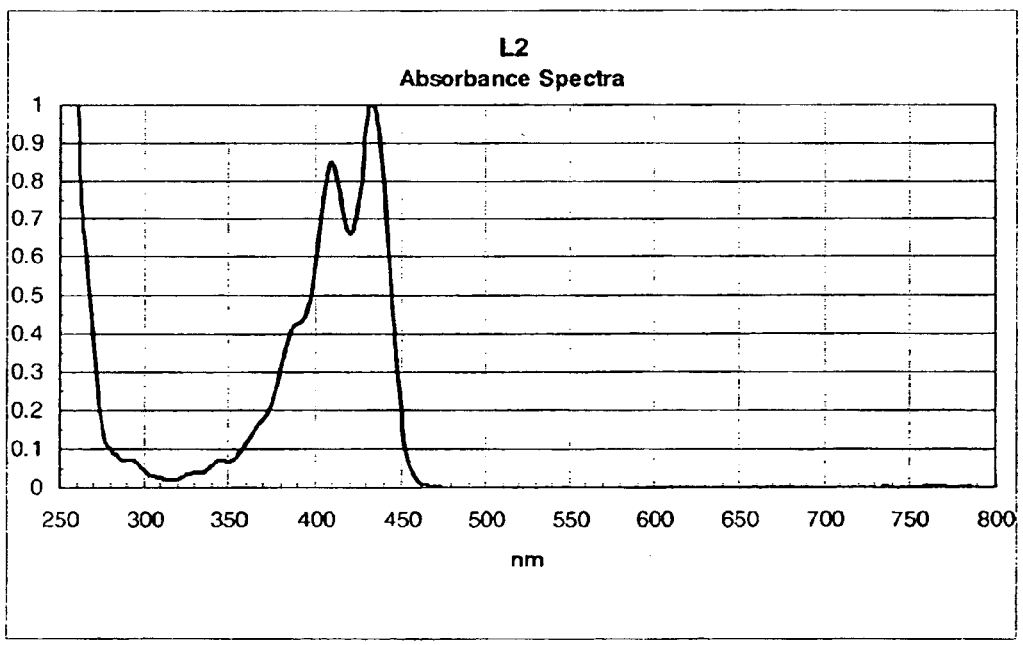
Figure 8:
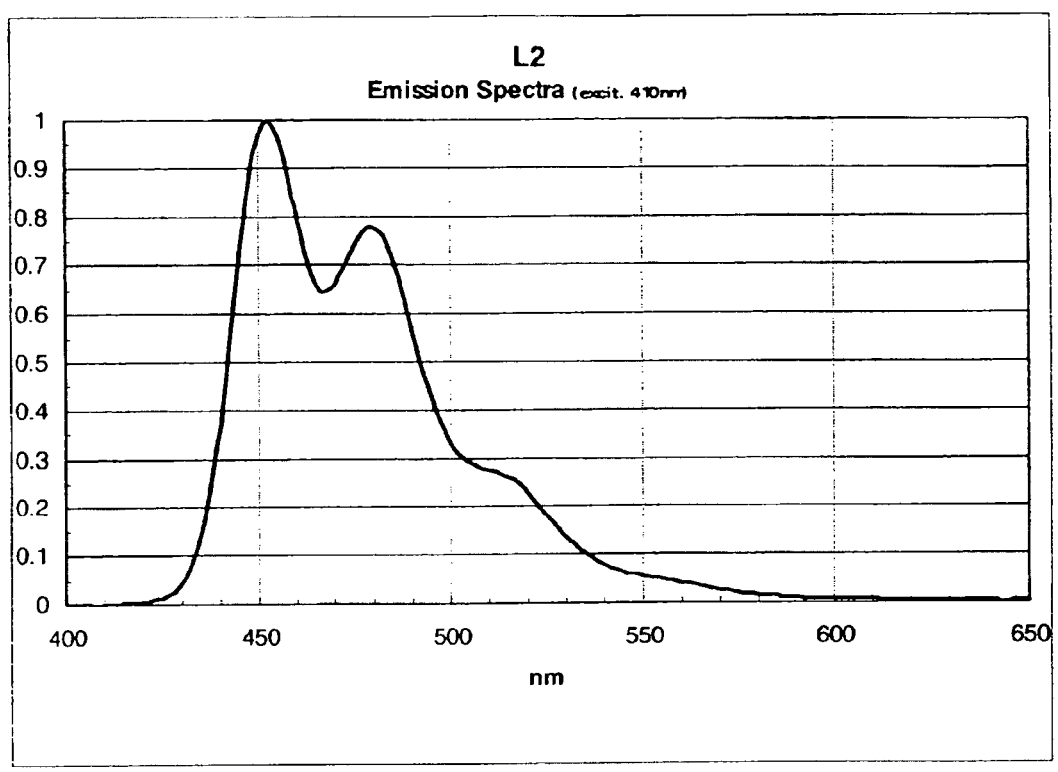
Figure 9:
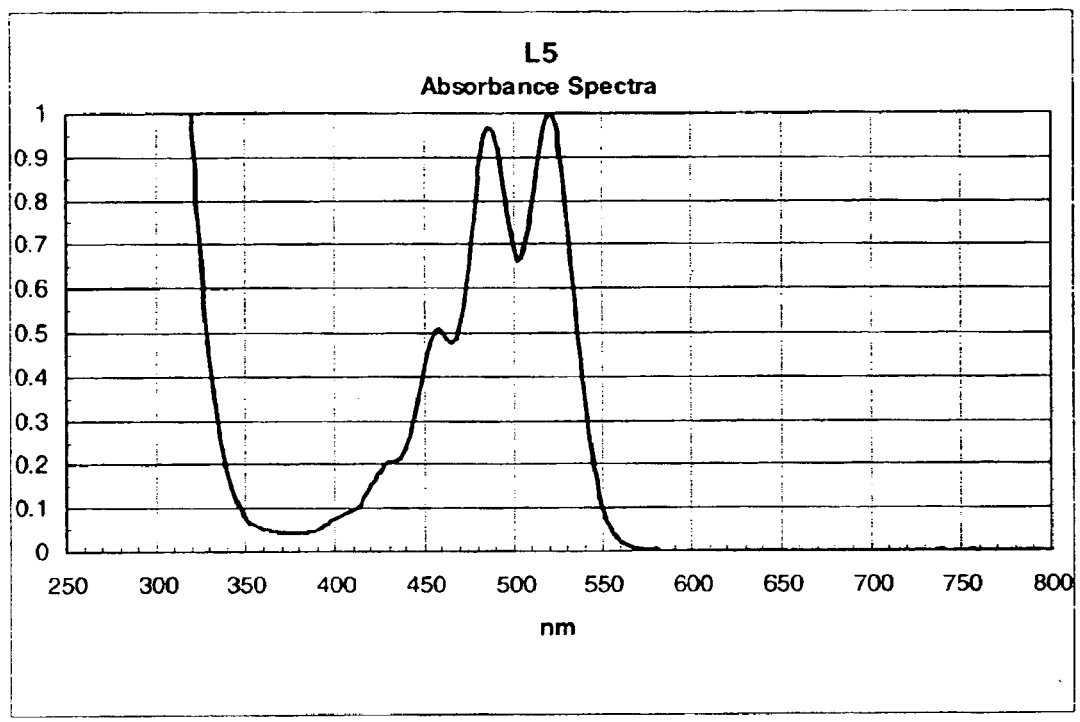
Figure 10:
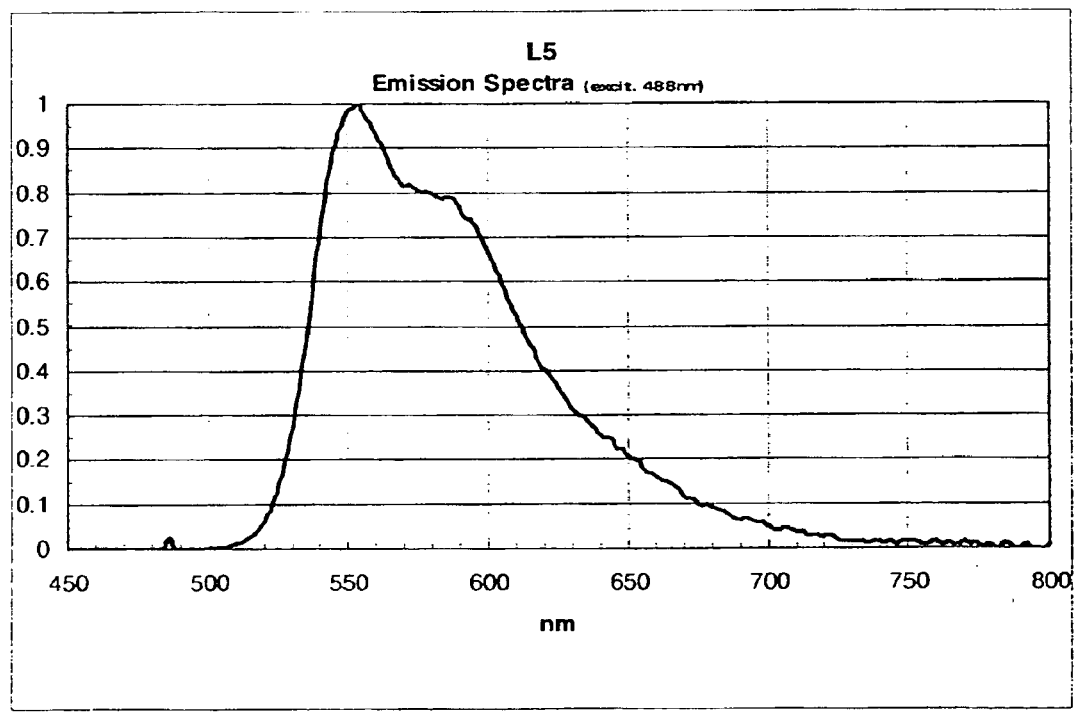
Figure 11:
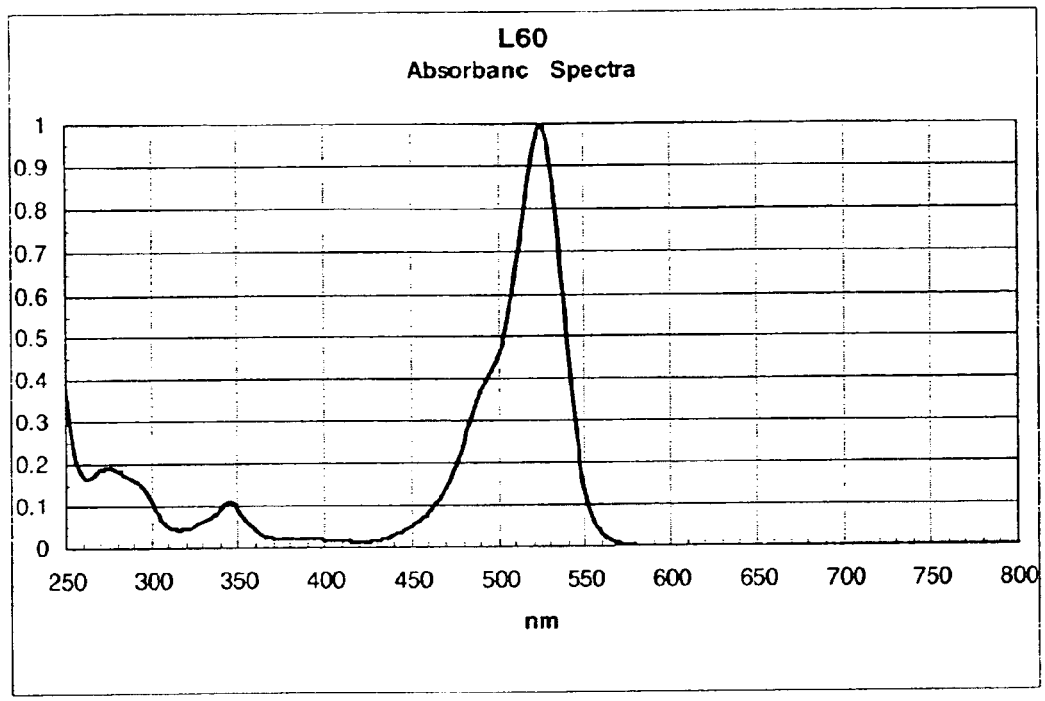
Figure 12:
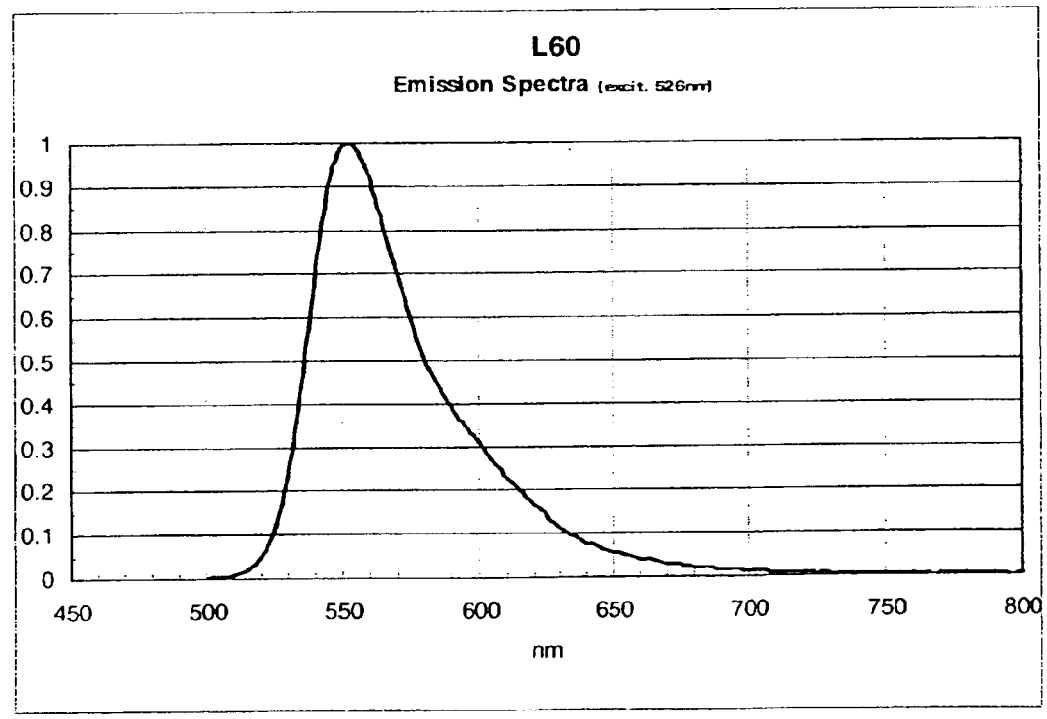
Figure 13:
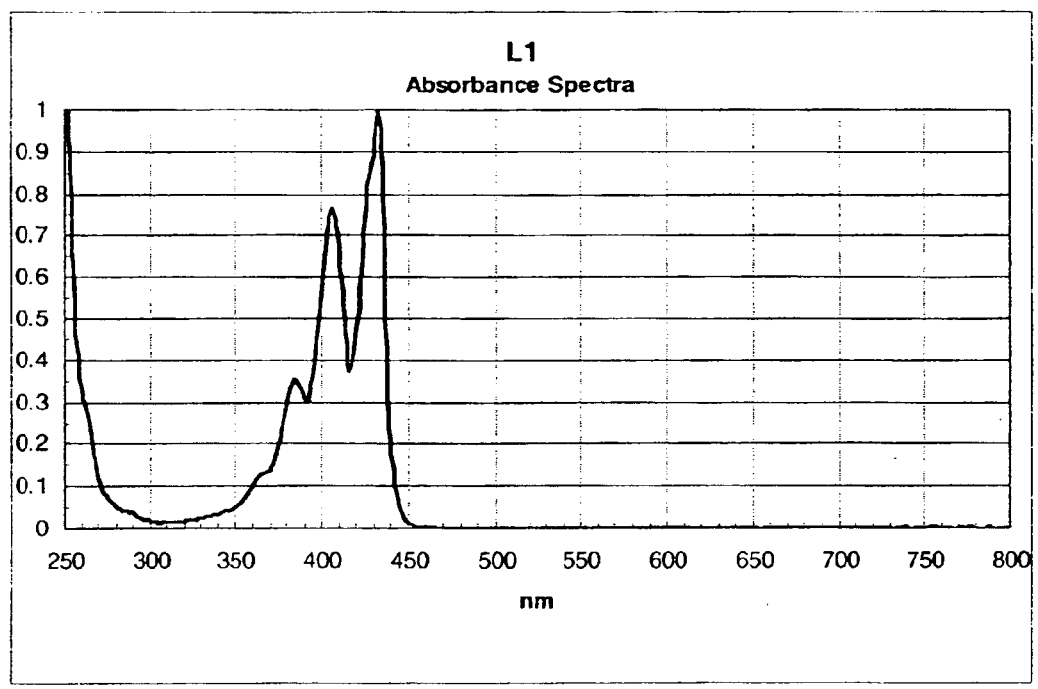
Figure 14:
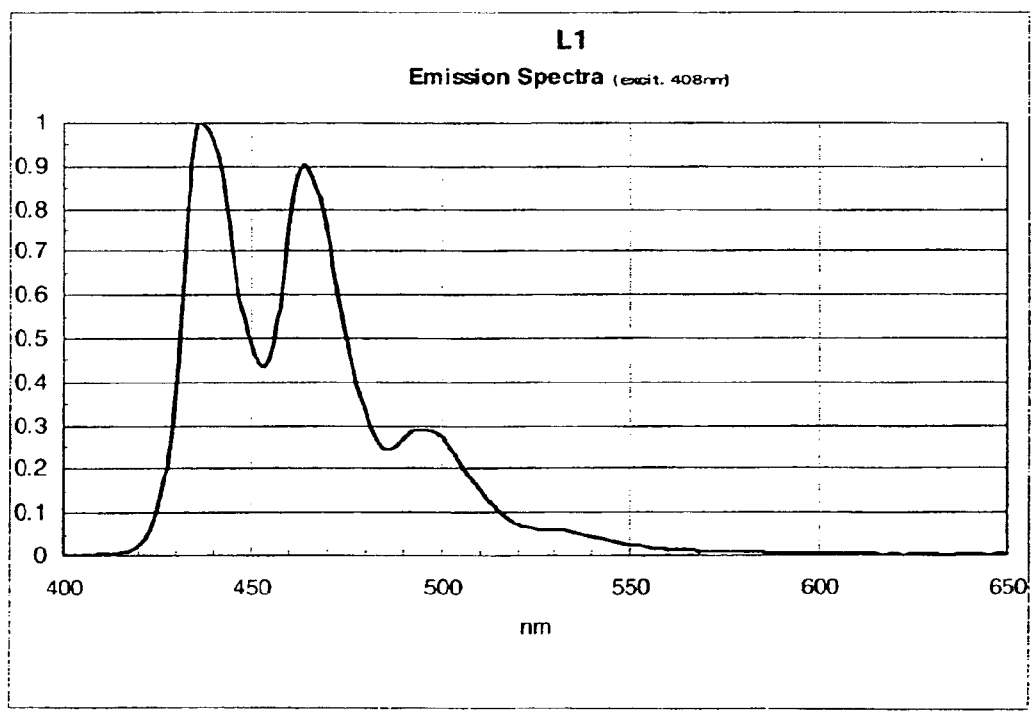
Figure 15:
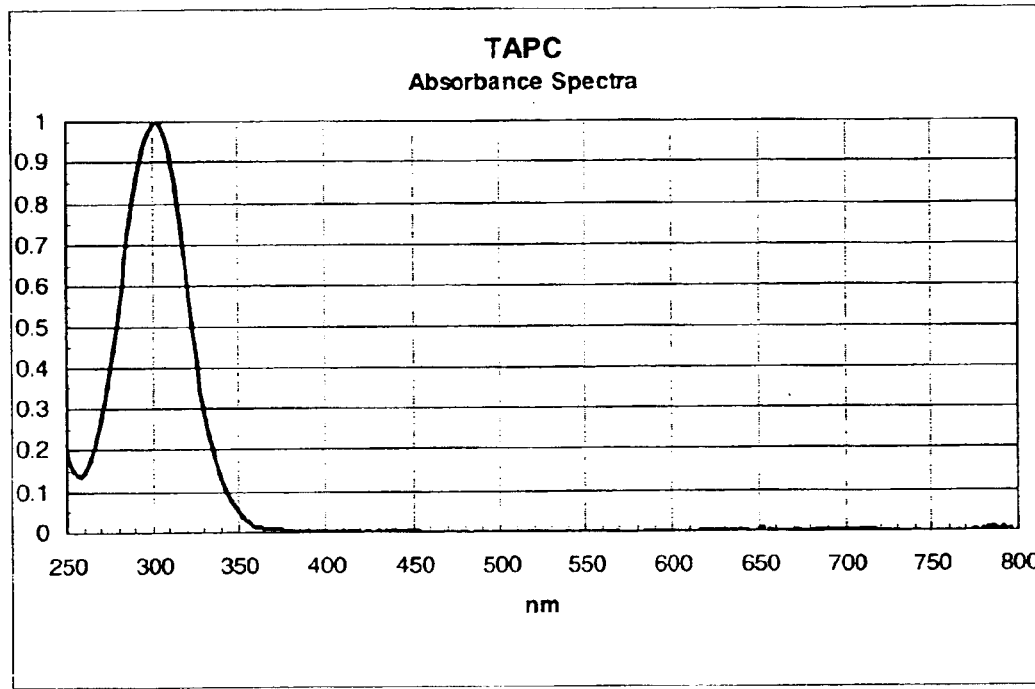
Figure 16:
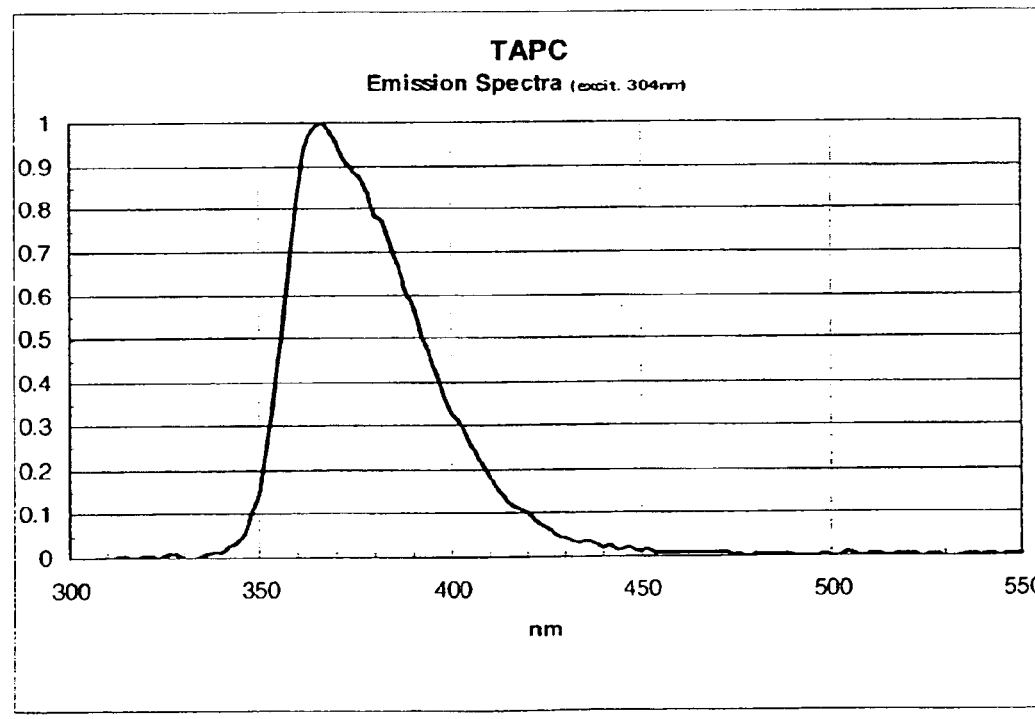
Figure 17:
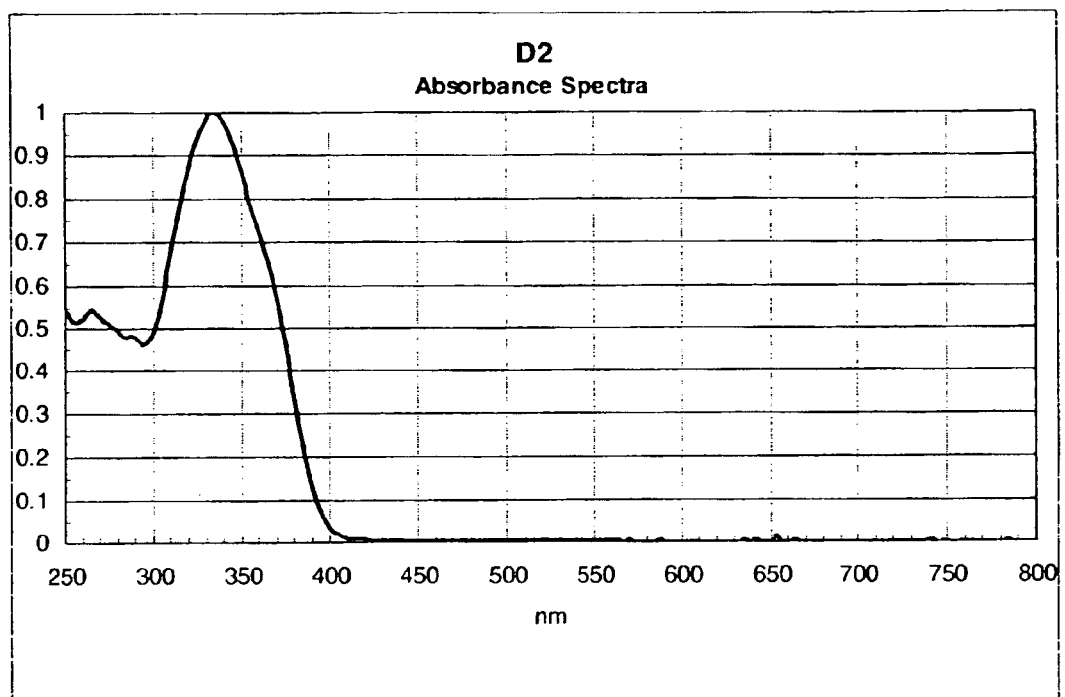
Figure 18:
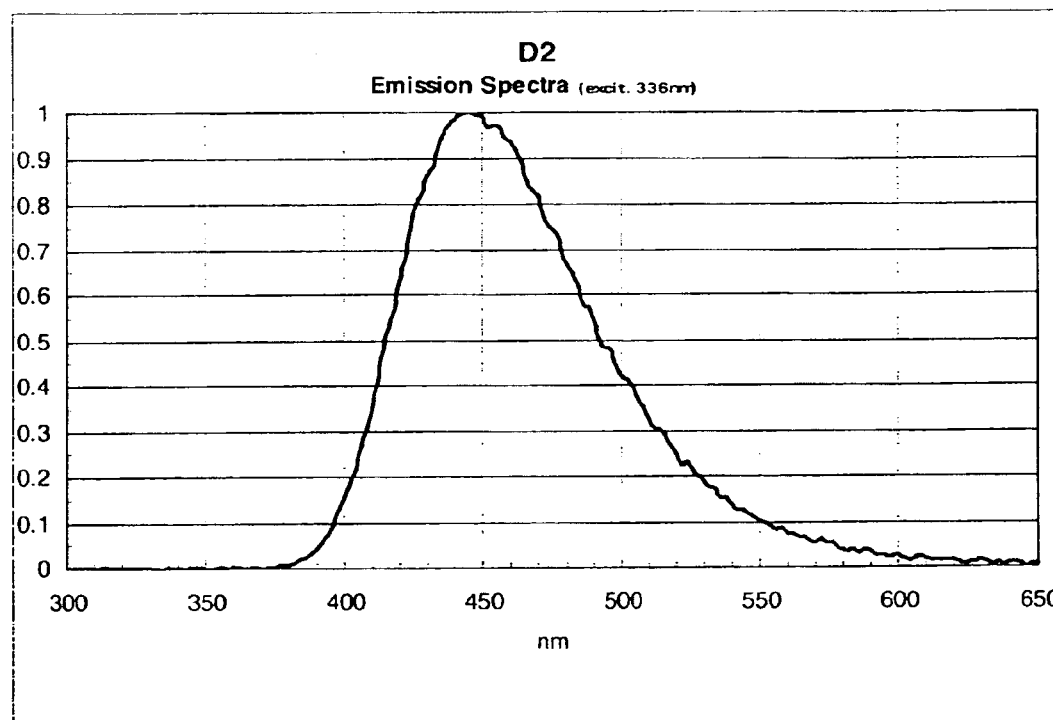
Figure 19:
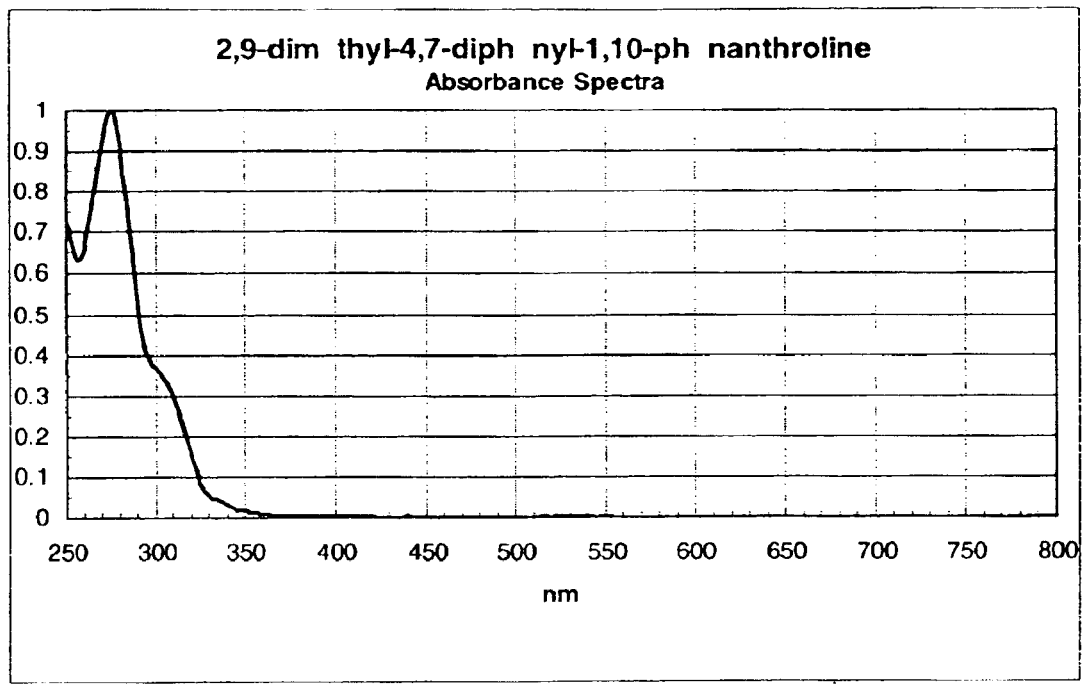
Figure 20:
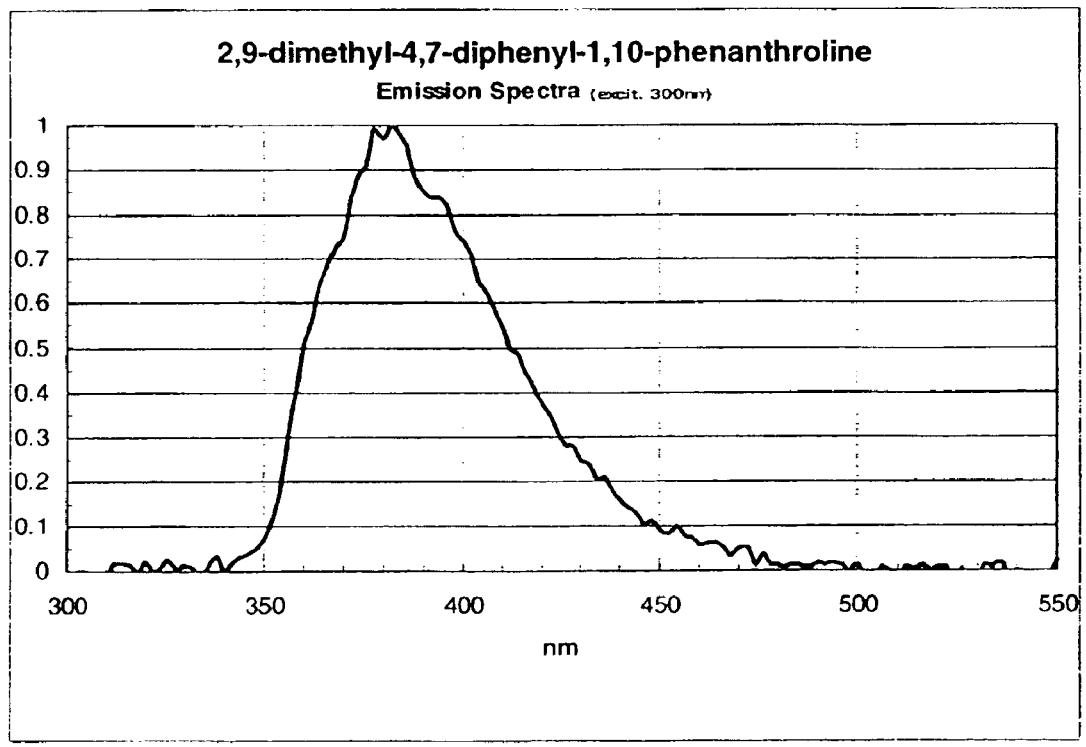
Figure 21:
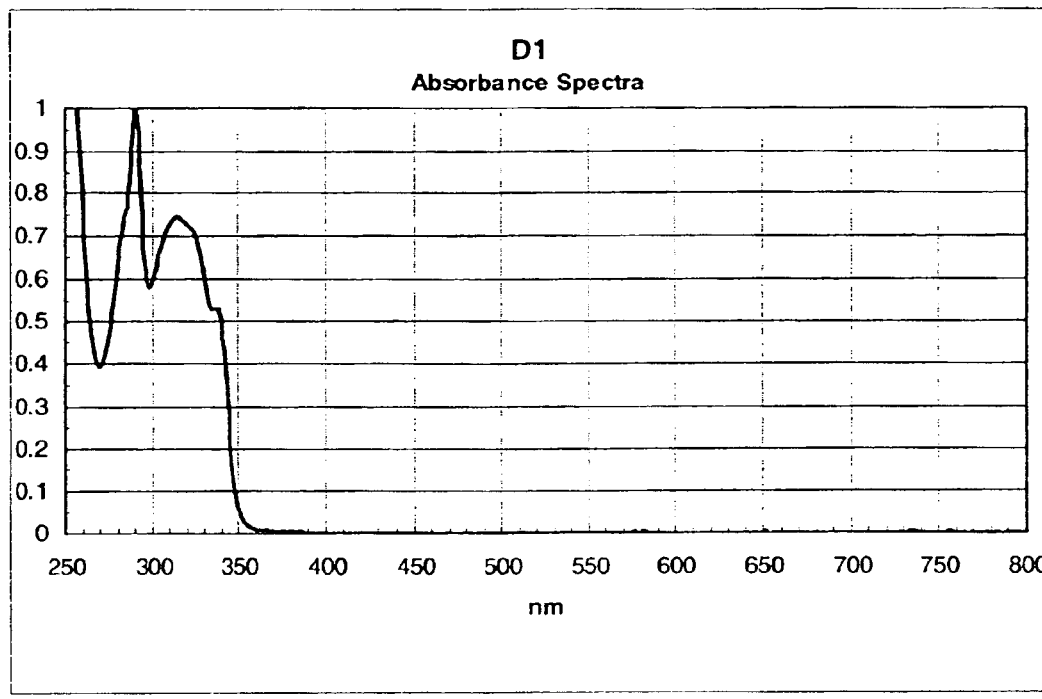
Figure 22:
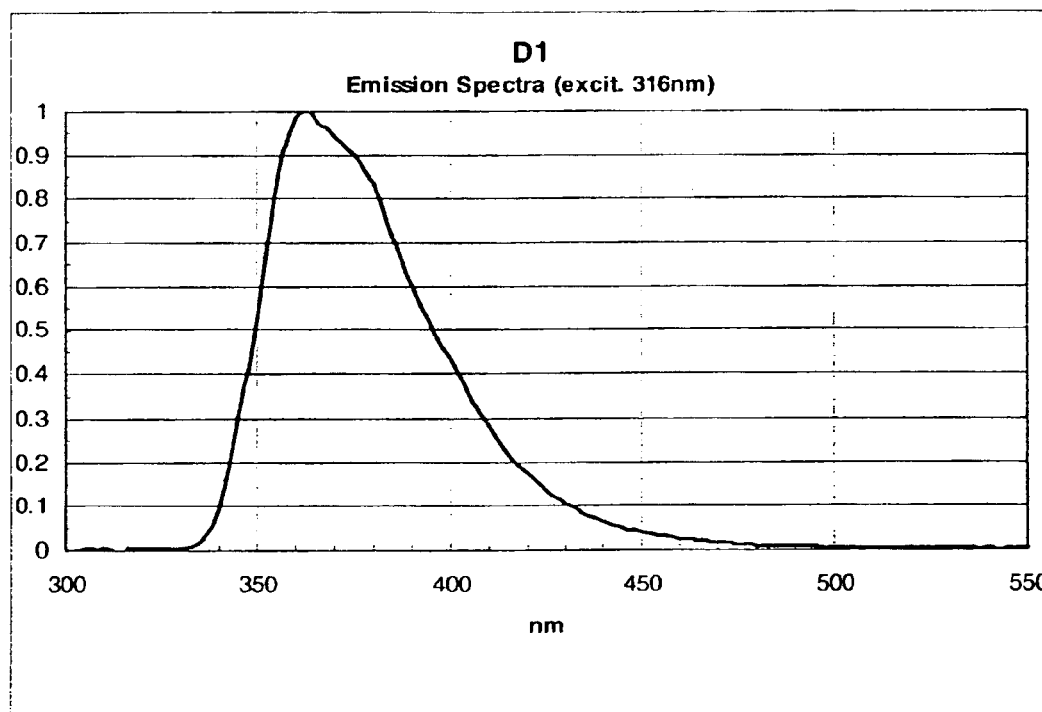
Figure 23:
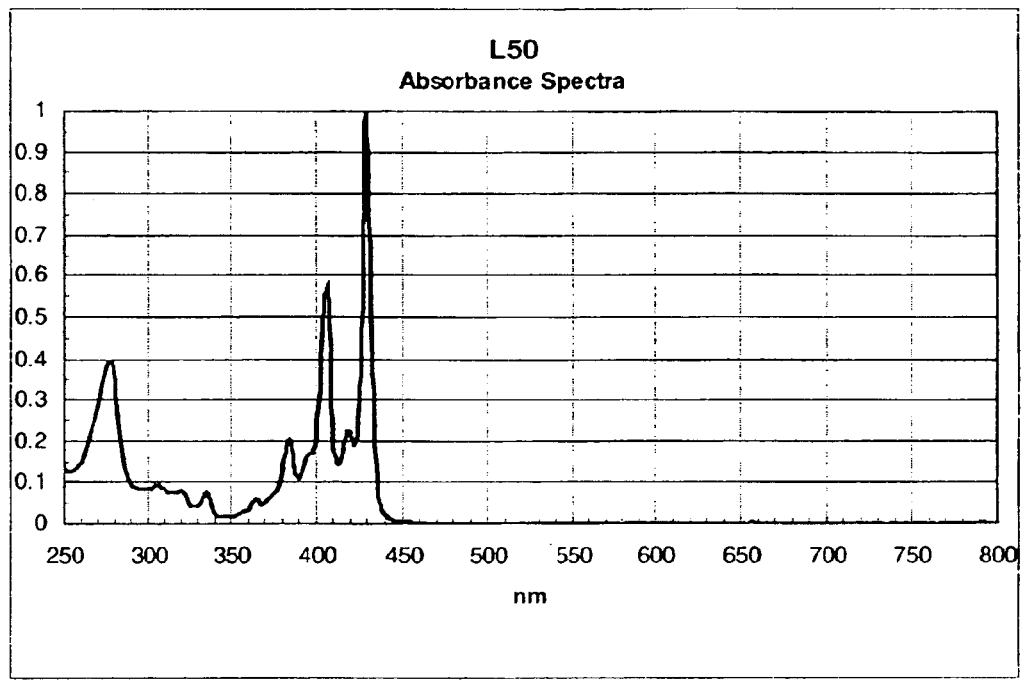
Figure 24:
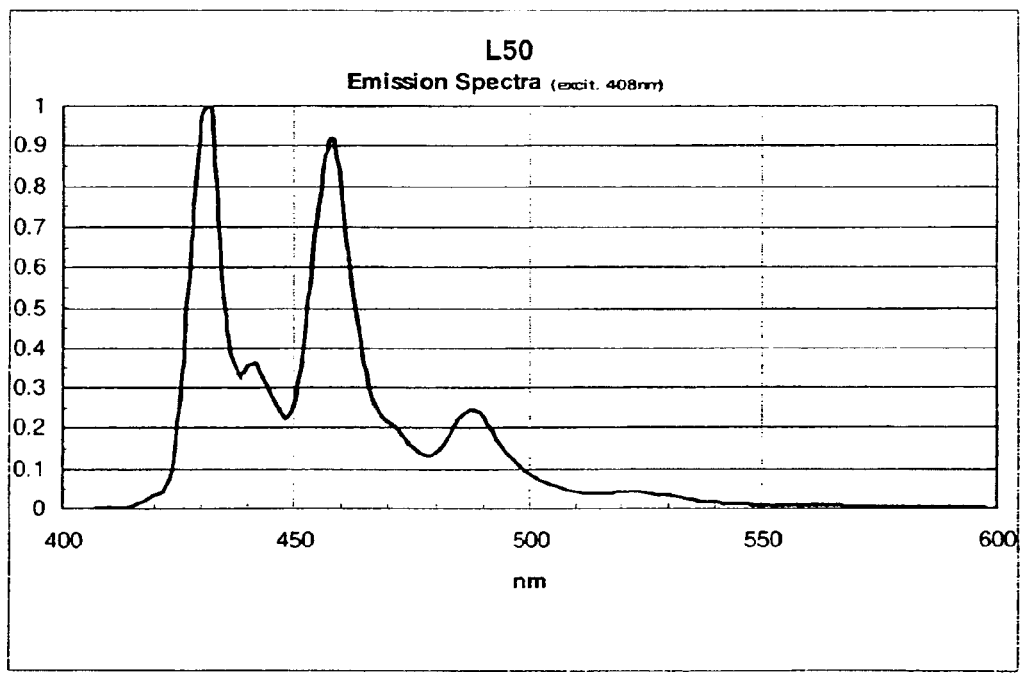
Figure 25:
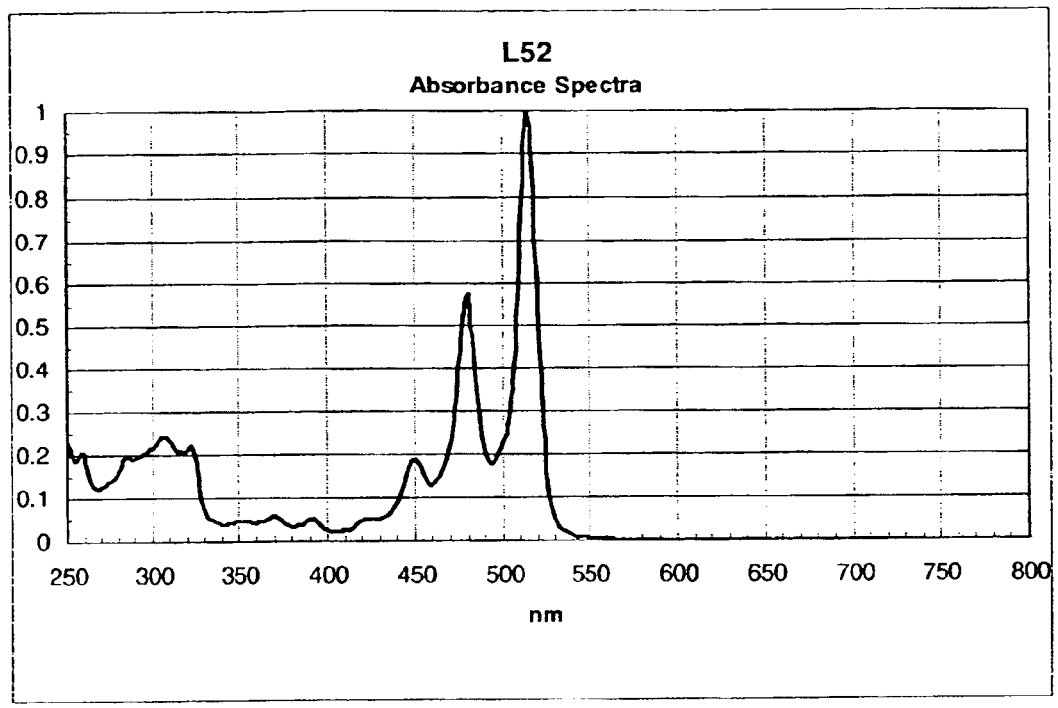
Figure 26:
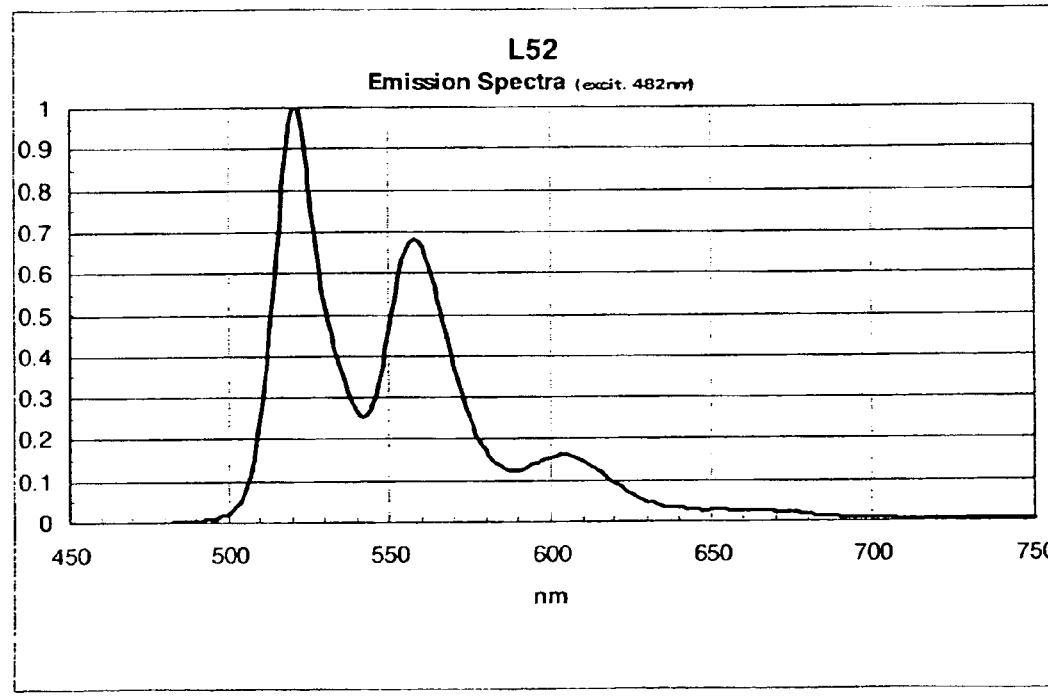
Figure 27:
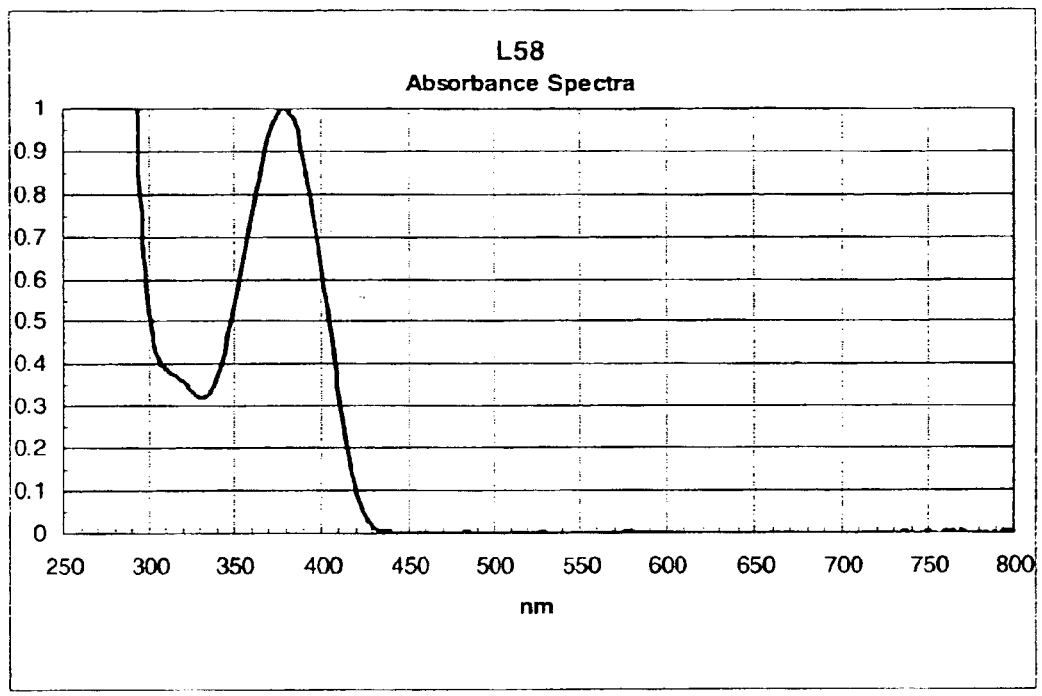
Figure 28:
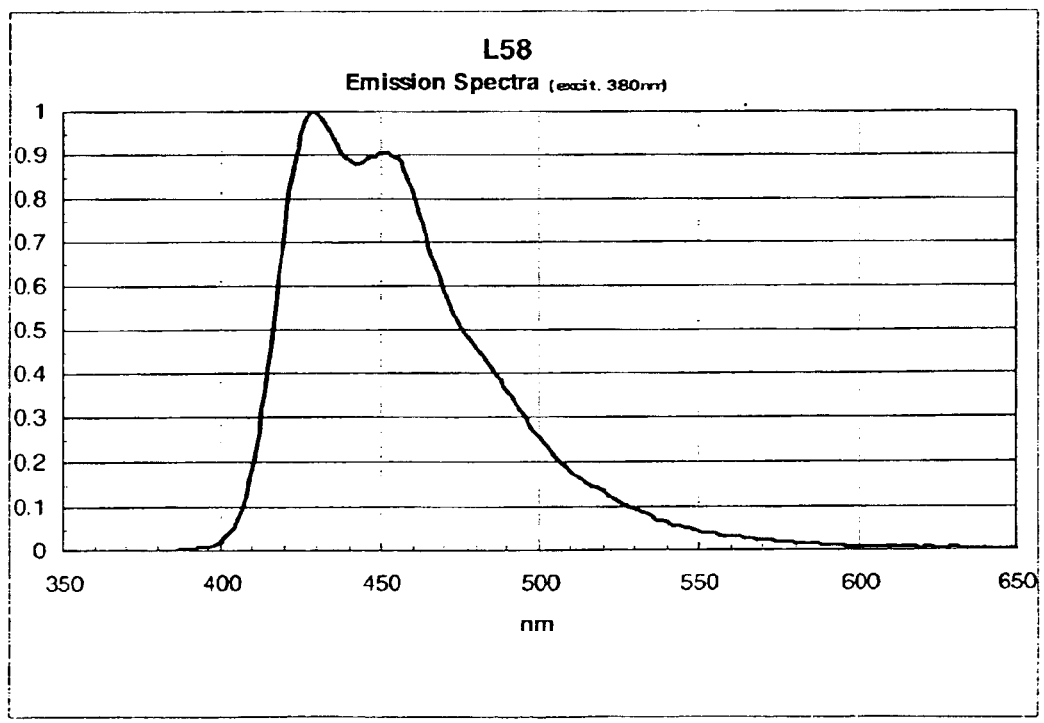
Figure 29:
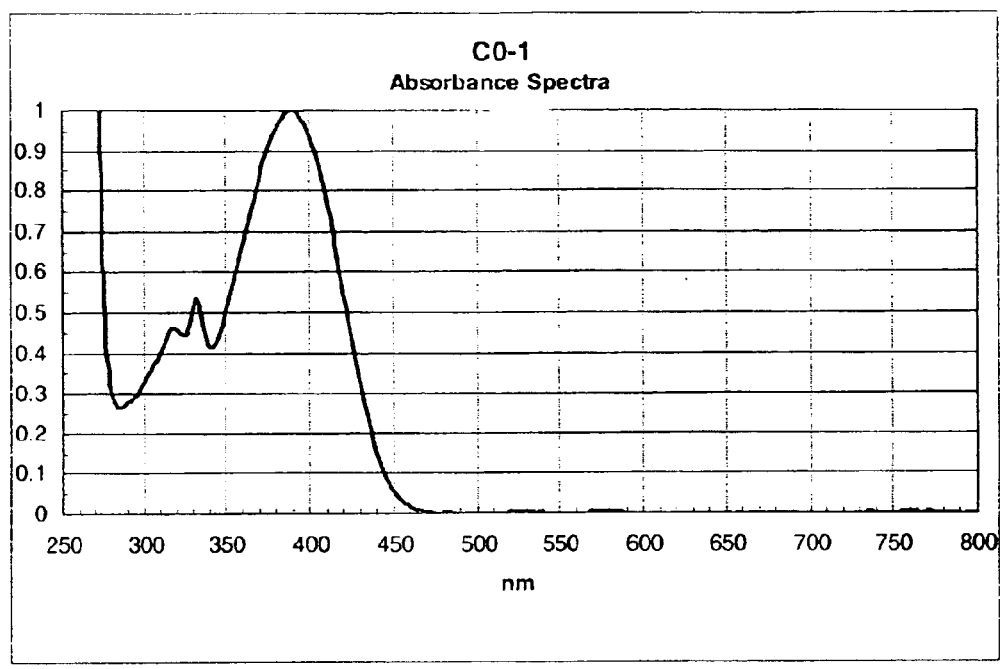
Figure 30:
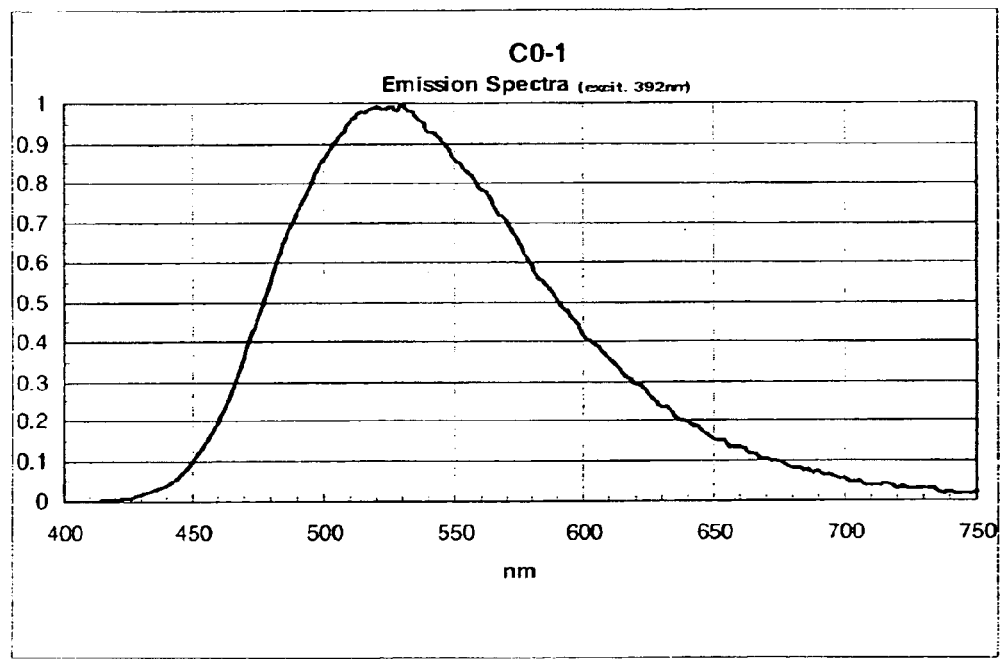
Figure 31:
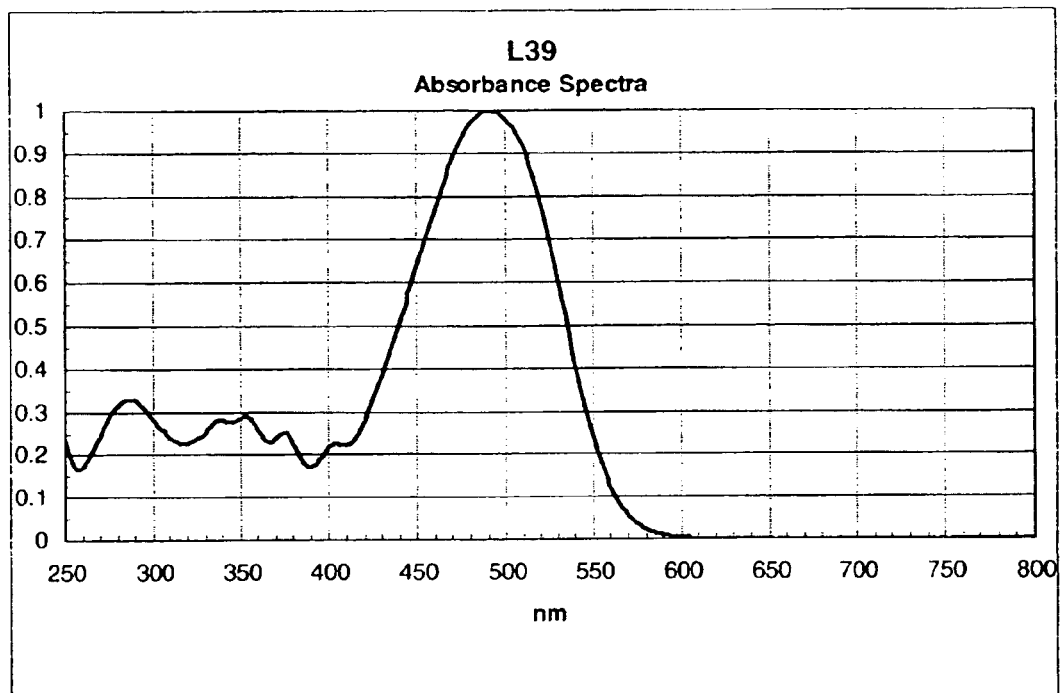
Figure 32:
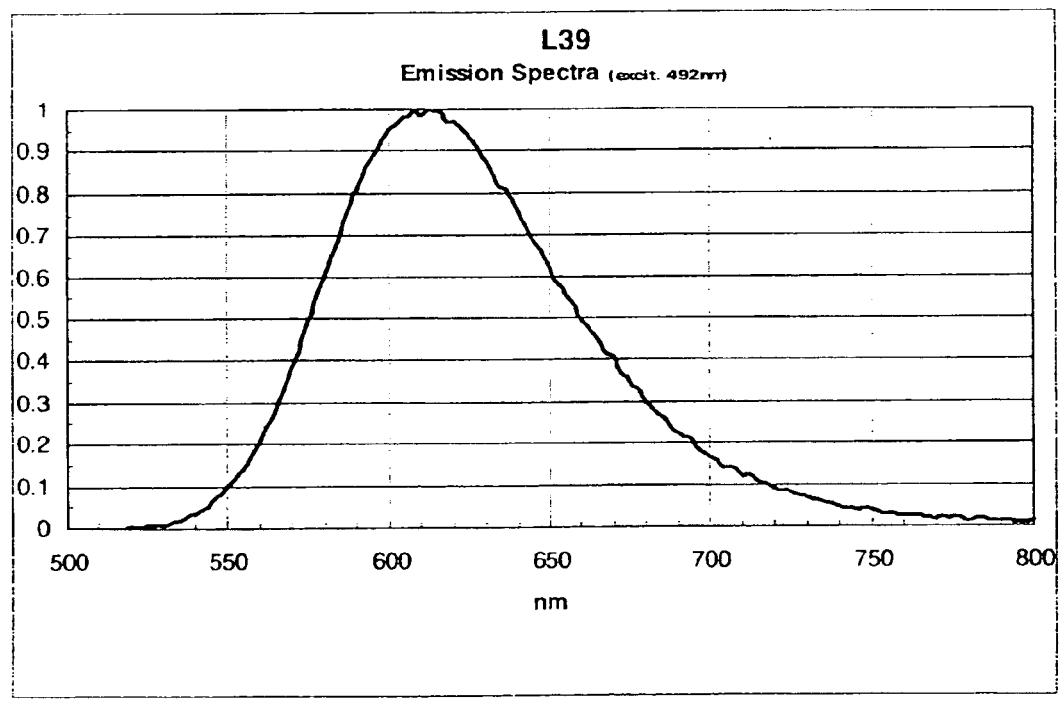
Figure 33:
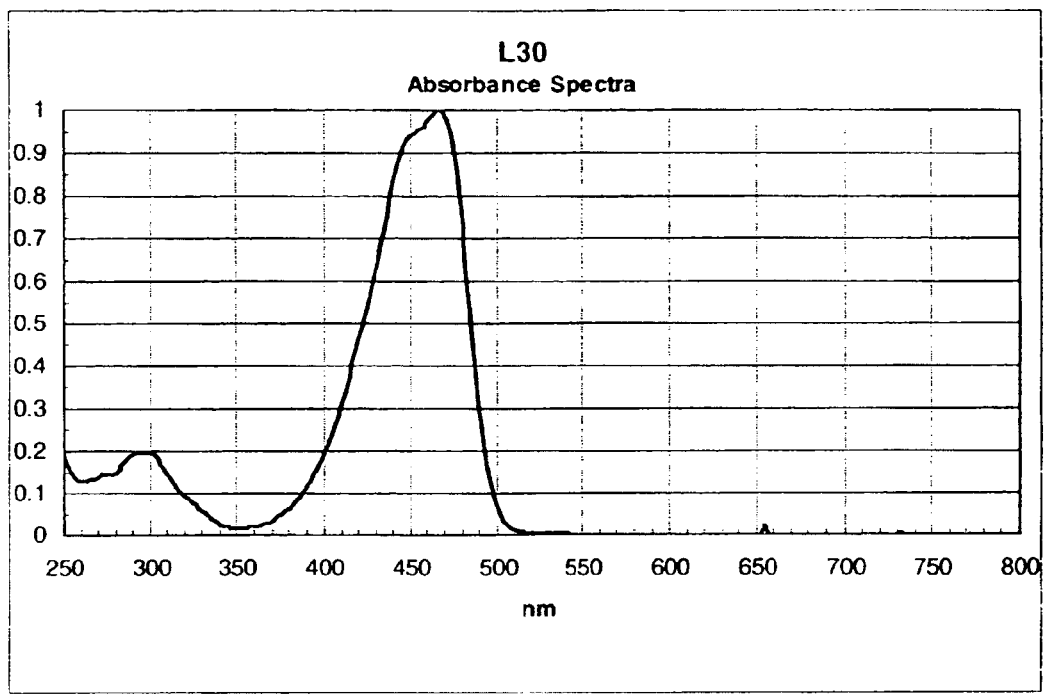
Figure 34:
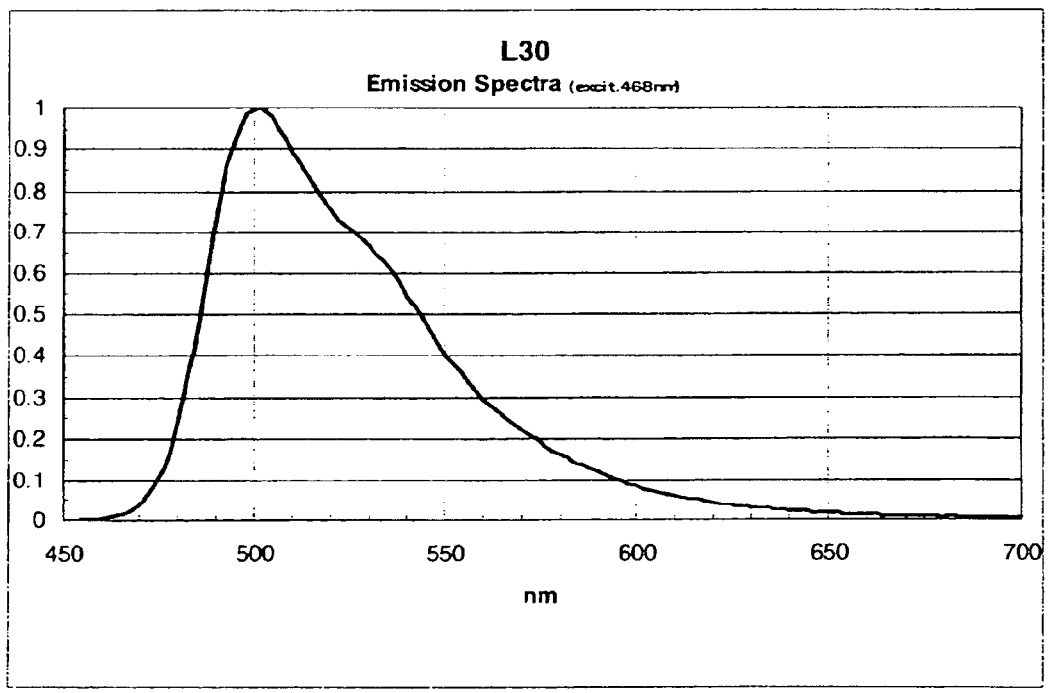
Figure 35:
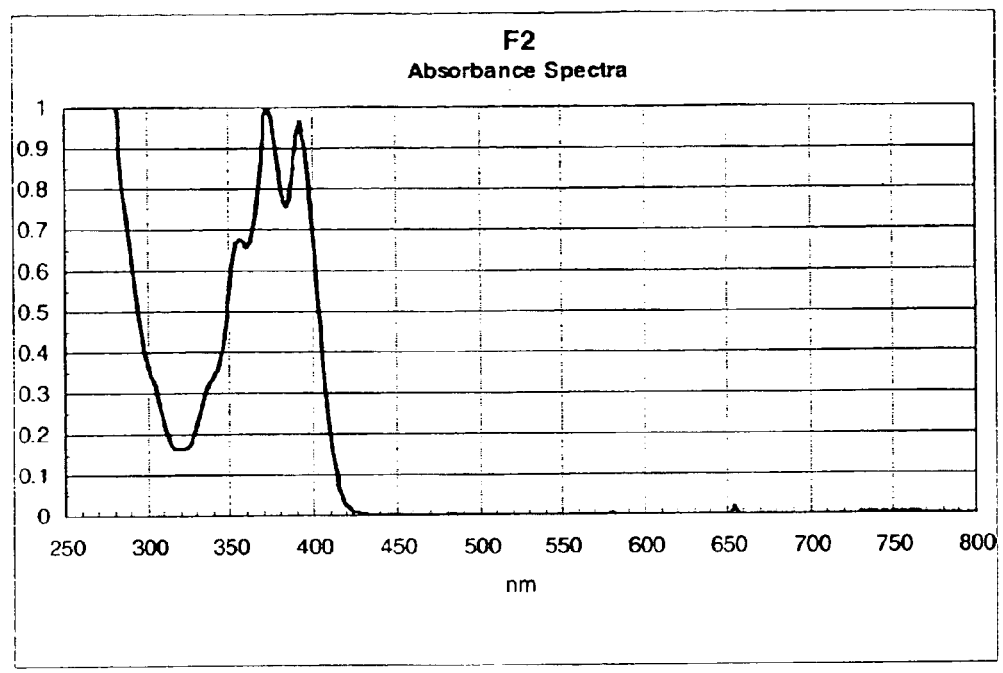
Figure 36:
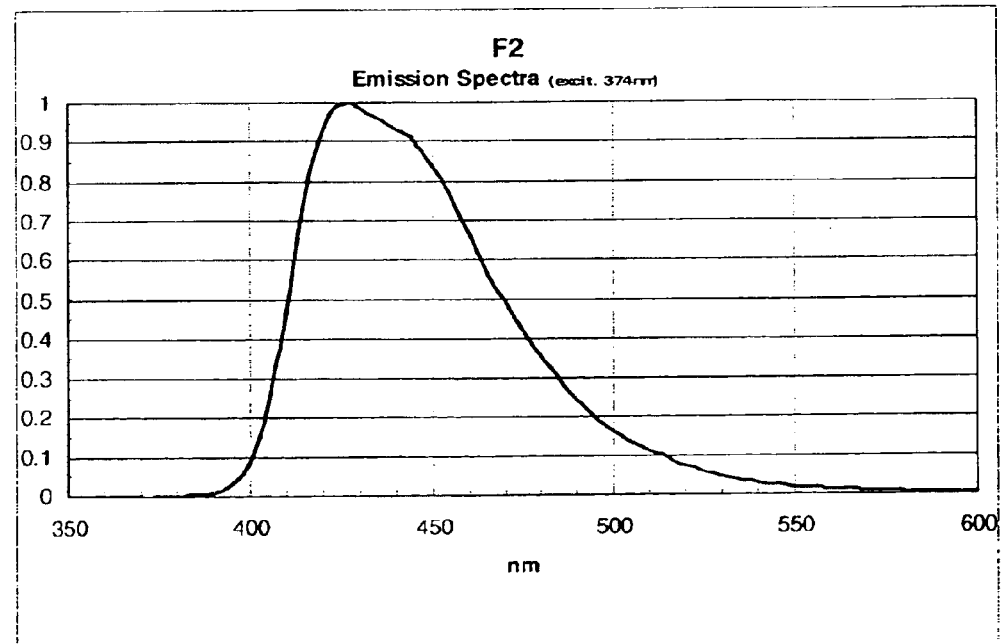
Figure 37:
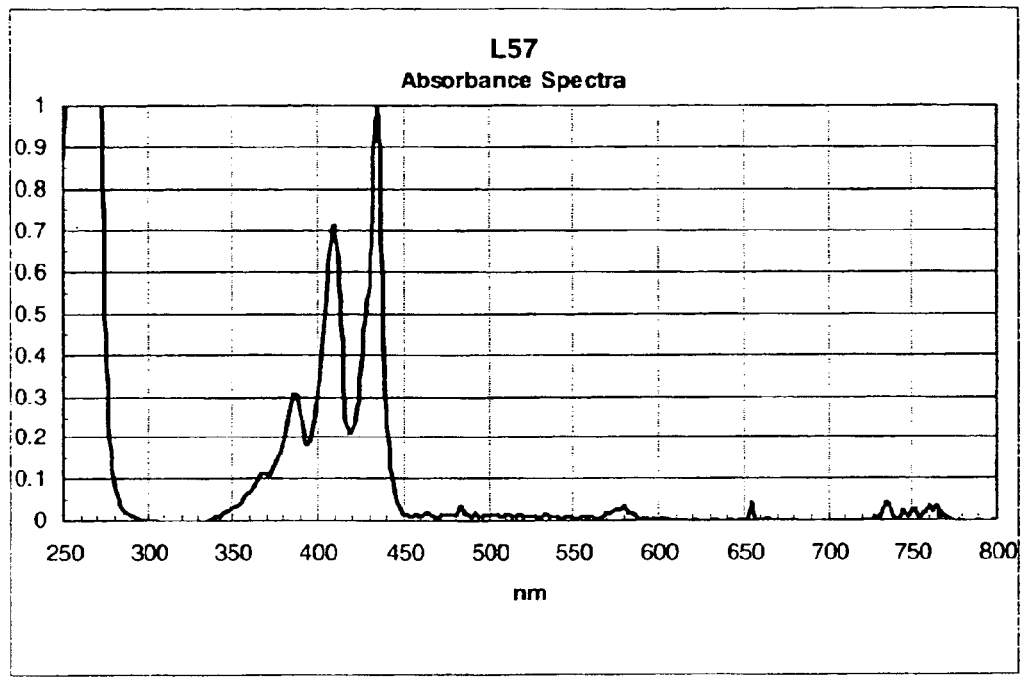
Figure 38:
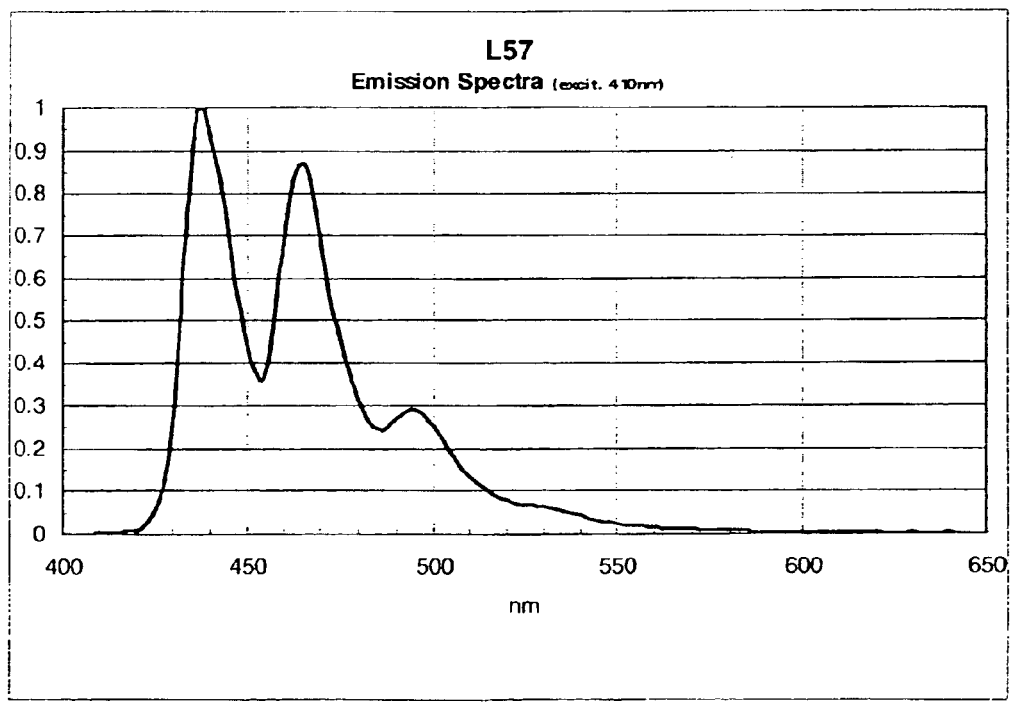
Figure 39:
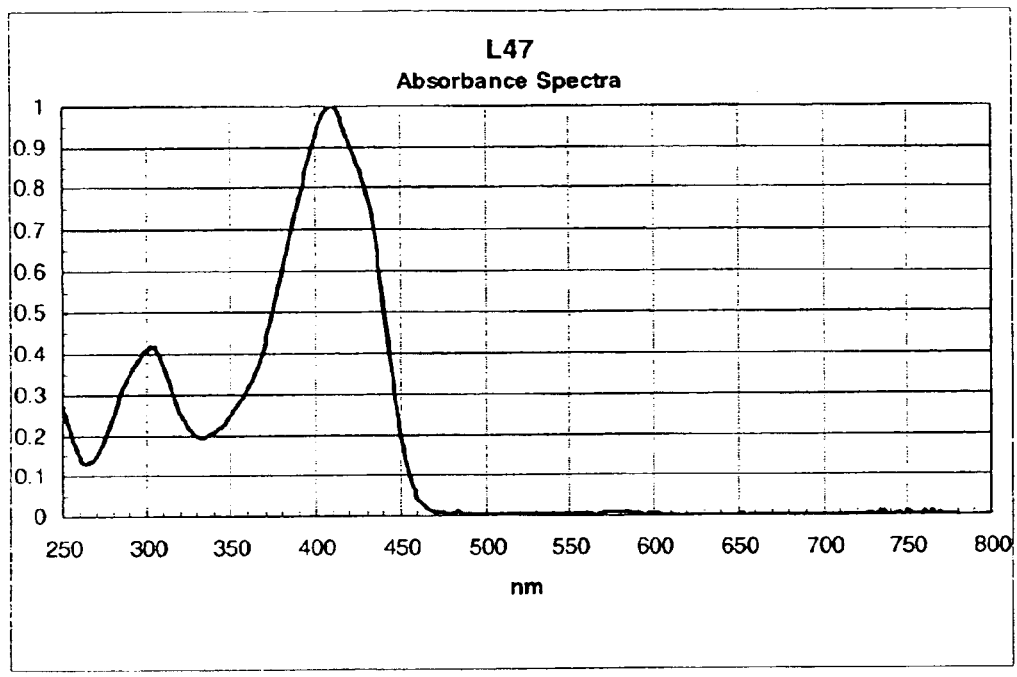
Figure 40:
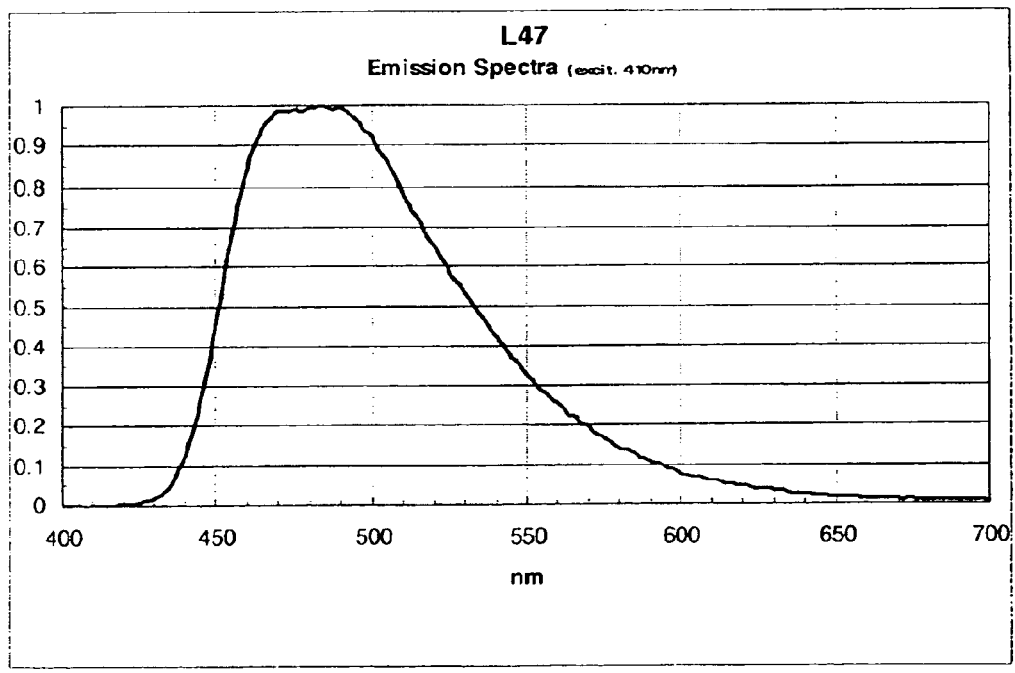
Figure 41:
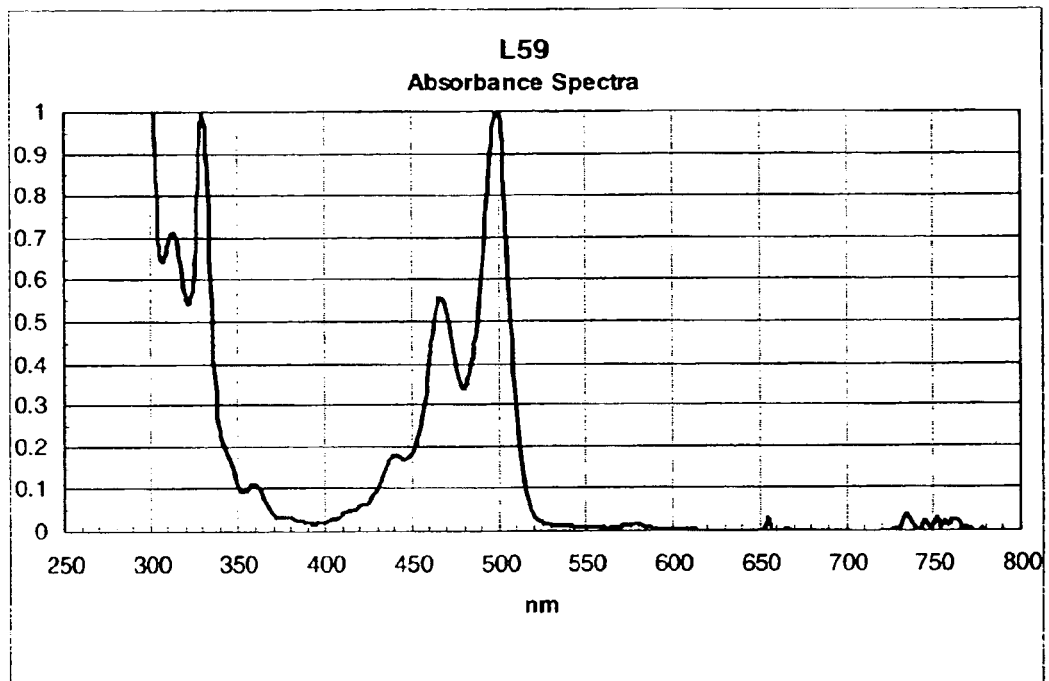
Figure 42:
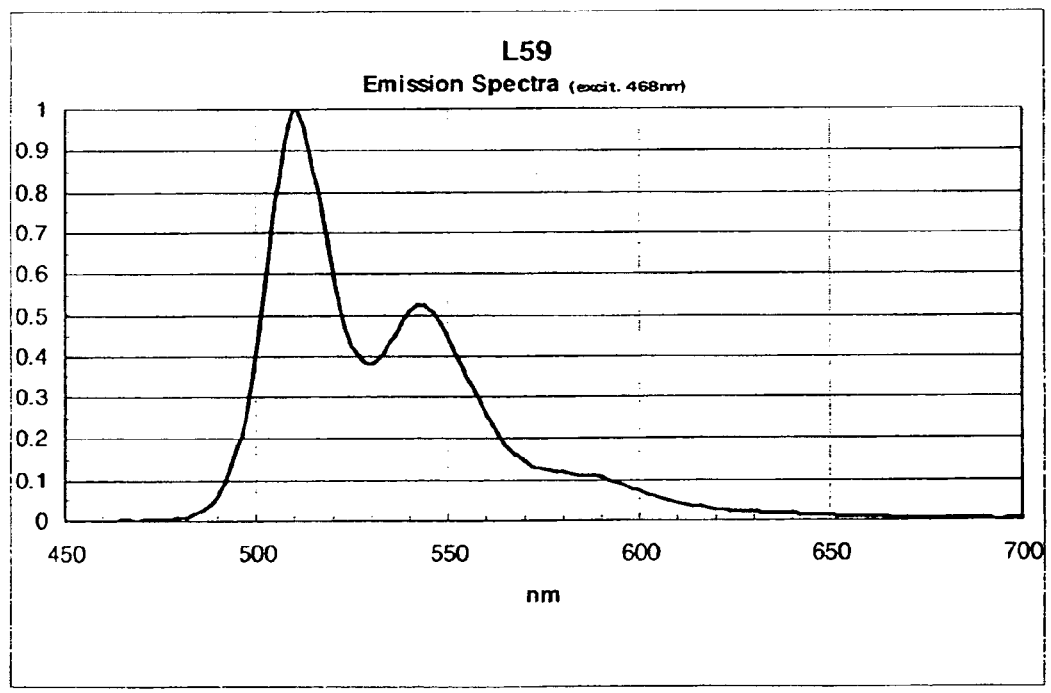
Figure 43:
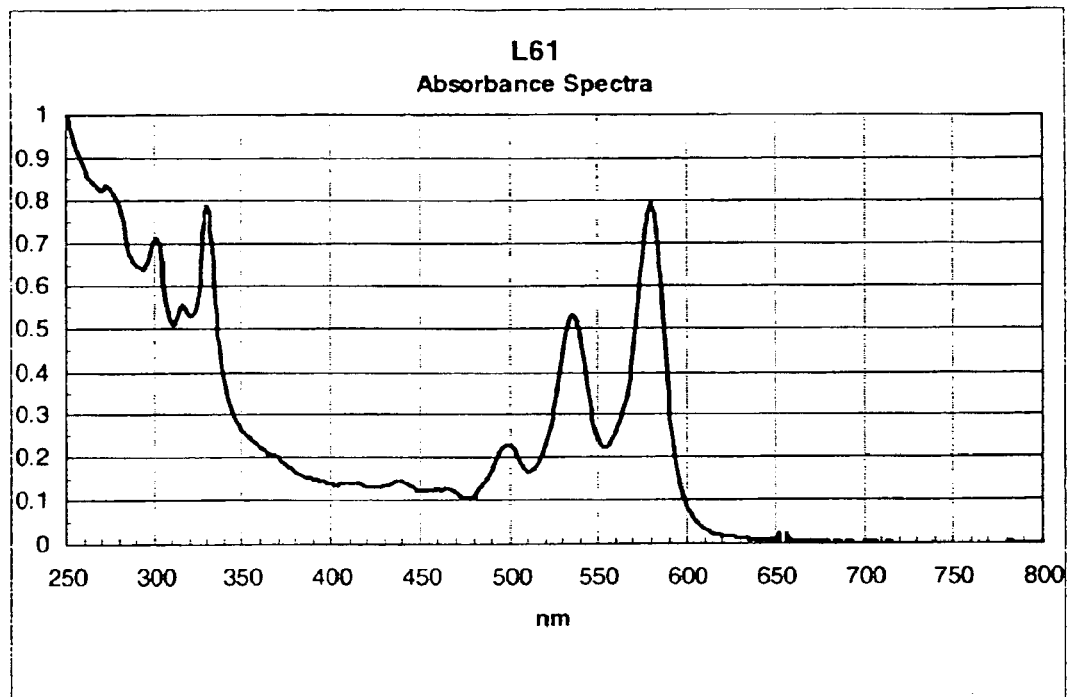
Figure 44:
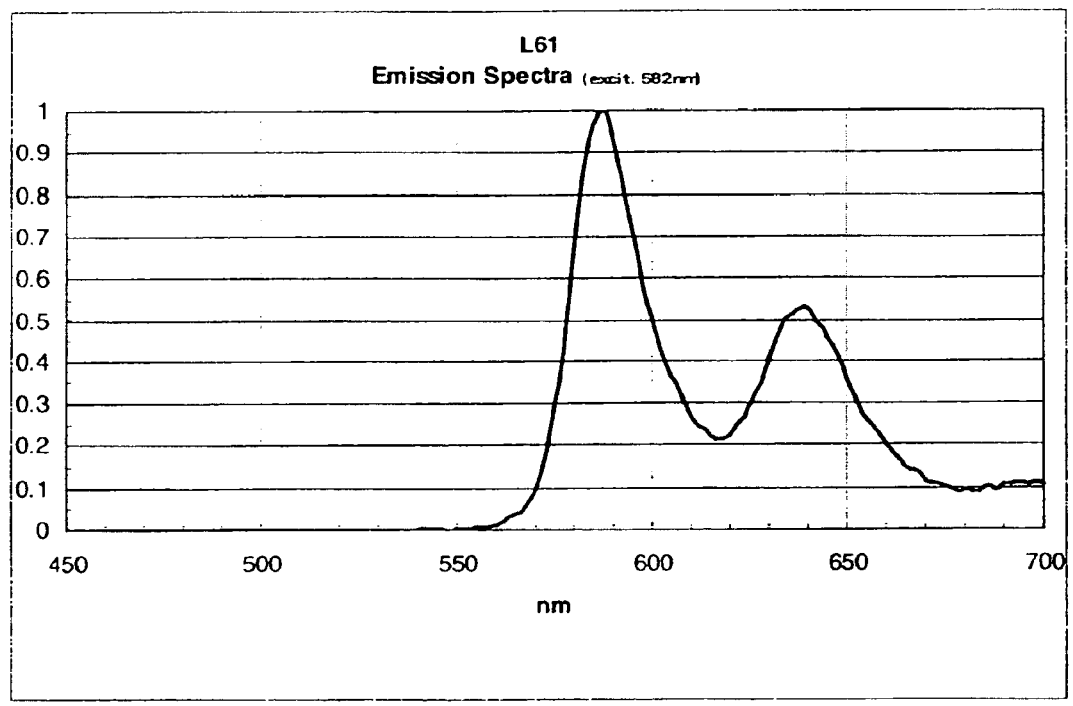
Figure 45:
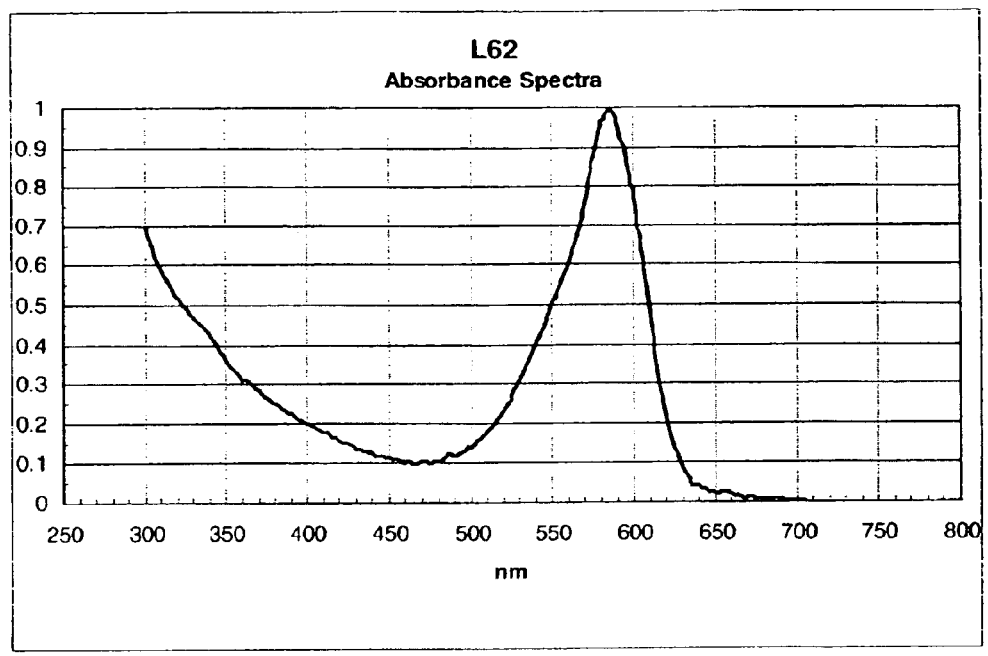
Figure 46:
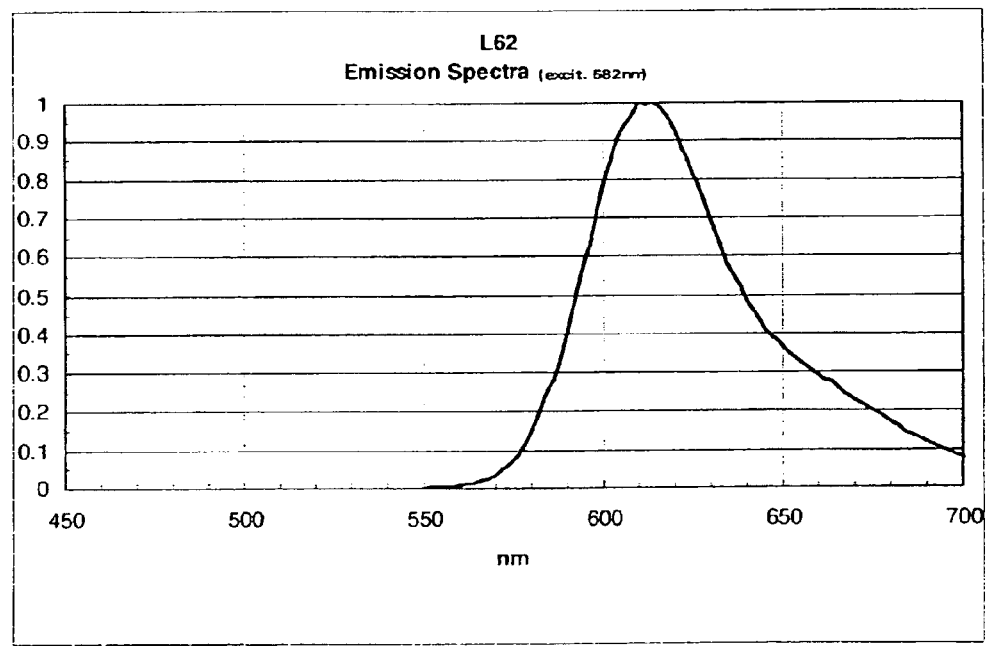

FIG. 2 is a side view schematic of the vertical cavity organic laser structure 10 with a more detailed view of the organic active region 40. The organic active region 40 includes one or more periodic gain regions 100 and organic spacer layers 110 disposed on either side of the periodic gain regions and arranged so that the periodic gain regions are aligned with the antinodes of the device's standing wave electromagnetic field. This is illustrated in FIG. 2 where the laser's standing electromagnetic field pattern 120 in the active region 40 is schematically drawn. The placement of the gain region(s) is determined by using the standard matrix method of optics (Corzine et al. IEEE J. Quant. Electr. 25, 1513, 1989). Since stimulated emission is highest at the antinodes and negligible at the nodes of the electromagnetic field, it is inherently advantageous to form the active region 40 as shown in FIG. 2. The spacer layers 110 do not undergo stimulated or spontaneous emission and largely do not absorb either the laser emission 70 or the pump-beam 60 wavelengths. An example of a spacer layer 110 is the organic material 1,1-Bis-(4-bis(4-methyl-phenyl)-amino-phenyl)-cyclohexane (TAPC). TAPC works well as the spacer material since it largely does not absorb either the laser output or the pump-beam and, in addition, its refractive index is slightly lower than that of most organic host materials. This refractive index difference is useful since it helps in maximizing the overlap between the electromagnetic field antinodes and the periodic gain region(s) 100. Employing periodic gain region(s) instead of a bulk gain region results in higher power conversion efficiencies and a significant reduction of the unwanted spontaneous emission.

Unless otherwise specifically stated, use of the term "substituted" or "substituent" means any group or atom other than hydrogen. Additionally, when the term "group" is used, it means that when a substituent group contains a substitutable hydrogen, it is also intended to encompass not only the substituent's unsubstituted form, but also its form further substituted with any substituent group or groups as herein mentioned, so long as the substituent does not destroy properties necessary for device utility. Suitably, a substituent group may be halogen or may be bonded to the remainder of the molecule by an atom of carbon, silicon, oxygen, nitrogen, phosphorous, sulfur, selenium, or boron. The substituent may be, for example, halogen, such as chloro, bromo or fluoro; nitro; hydroxyl; cyano; carboxyl; or groups which may be further substituted, such as alkyl, including straight or branched chain or cyclic alkyl, such as methyl, trifluoromethyl, ethyl, t-butyl, 3-(2,4-di-t-pentylphenoxy) propyl, and tetradecyl; alkenyl, such as ethylene, 2-butene; alkoxy, such as methoxy, ethoxy, propoxy, butoxy, 2-methoxyethoxy, sec-butoxy, hexyloxy, 2-ethylhexyloxy, tetradecyloxy, 2-(2,4-di-t-pentylphenoxy)ethoxy, and 2-dodecyloxyethoxy; aryl such as phenyl, 4-t-butylphenyl, 2,4,6-trimethylphenyl, naphthyl; aryloxy, such as phenoxy, 2-methylphenoxy, alpha- or beta-naphthyloxy, and 4-tolyloxy; carbonamido, such as acetamido, benzamido, butyramido, tetradecanamido, alpha-(2,4-di-t-pentylphenoxy)acetamido, alpha-(2,4-di-t-pentylphenoxy) butyramido, alpha-(3-pentadecylphenoxy)-hexanamido, alpha-(4-hydroxy-3-t-butylphenoxy)-tetradecanamido, 2-oxo-pyrrolidin-1-yl, 2-oxo-5-tetradecylpyrrolin-1-yl, N-methyltetradecanamido, N-succinimido, N-phthalimido, 2,5-dioxo-1-oxazolidinyl, 3-dodecyl-2,5-dioxo-1-imidazolyl, and N-acetyl-N-dodecylamino, ethoxycarbonylamino, phenoxycarbonylamino, benzyloxycarbonylamino, hexadecyloxycarbonylamino, 2,4-di-t-butylphenoxycarbonylamino, phenylcarbonylamino, 2,5-(di-t-pentylphenyl)carbonylamino, p-dodecyl-phenylcarbonylamino, p-tolylcarbonylamino, N-methylureido, N,N-dimethylureido, N-methyl-N-dodecylureido, N-hexadecylureido, N,N-dioctadecylureido, N,N-dioctyl-N'-ethylureido, N-phenylureido, N,N-diphenylureido, N-phenyl-N-p-tolylureido, N-(m-hexadecylphenyl)ureido, N,N-(2,5-di-t-pentylphenyl)-N'-ethylureido, and t-butylcarbonamido; sulfonamido, such as methylsulfonamido, benzenesulfonamido, p-tolylsulfonamido, p-dodecylbenzenesulfonamido, N-methyltetradecylsulfonamido, N,N-dipropyl-sulfamoylamino, and hexadecylsulfonamido; sulfamoyl, such as N-methylsulfamoyl, N-ethylsulfamoyl, N,N-dipropylsulfamoyl, N-hexadecylsulfamoyl, N,N-dimethylsulfamoyl, N-[3-(dodecyloxy)propyl]sulfamoyl, N-[4-(2,4-di-t-pentylphenoxy)butyl]sulfamoyl, N-methyl-N-tetradecylsulfamoyl, and N-dodecylsulfamoyl; carbamoyl, such as N-methylcarbamoyl, N,N-dibutylcarbamoyl, N-octadecylcarbamoyl, N-[4-(2,4-di-t-pentylphenoxy)butyl]carbamoyl, N-methyl-N-tetradecylcarbamoyl, and N,N-dioctylcarbamoyl; acyl, such as acetyl, (2,4-di-t-amylphenoxy)acetyl, phenoxycarbonyl, p-dodecyloxyphenoxycarbonyl methoxycarbonyl, butoxycarbonyl, tetradecyloxycarbonyl, ethoxycarbonyl, benzyloxycarbonyl, 3-pentadecyloxycarbonyl, and dodecyloxycarbonyl; sulfonyl, such as methoxysulfonyl, octyloxysulfonyl, tetradecyloxysulfonyl, 2-ethylhexyloxysulfonyl, phenoxysulfonyl, 2,4-di-t-pentylphenoxysulfonyl, methylsulfonyl, octylsulfonyl, 2-ethylhexylsulfonyl, dodecylsulfonyl, hexadecylsulfonyl, phenylsulfonyl, 4-nonylphenylsulfonyl, and p-tolylsulfonyl; sulfonyloxy, such as dodecylsulfonyloxy, and hexadecylsulfonyloxy; sulfinyl, such as methylsulfinyl, octylsulfinyl, 2-ethylhexylsulfinyl, dodecylsulfinyl, hexadecylsulfinyl, phenylsulfinyl, 4-nonylphenylsulfinyl, and p-tolylsulfinyl; thio, such as ethylthio, octylthio, benzylthio, tetradecylthio, 2-(2,4-di-t-pentylphenoxy)ethylthio, phenylthio, 2-butoxy-5-t-octylphenylthio, and p-tolylthio; acyloxy, such as acetyloxy, benzoyloxy, octadecanoyloxy, p-dodecylamidobenzoyloxy, N-phenylcarbamoyloxy, N-ethylcarbamoyloxy, and cyclohexylcarbonyloxy; amine, such as phenylanilino, 2-chloroanilino, diethylamine, dodecylamine; imino, such as 1 (N-phenylimido)ethyl, N-succinimido or 3-benzylhydantoinyl; phosphate, such as dimethylphosphate and ethylbutylphosphate; phosphite, such as diethyl and dihexylphosphite; a heterocyclic group, a heterocyclic oxy group or a heterocyclic thio group, each of which may be substituted and which contain a 3 to 7 membered heterocyclic ring composed of carbon atoms and at least one hetero atom selected from the group consisting of oxygen, nitrogen, sulfur, phosphorous, or boron, such as 2-furyl, 2-thienyl, 2-benzimidazolyloxy or 2-benzothiazolyl; quaternary ammonium, such as triethylammonium; quaternary phosphonium, such as triphenylphosphonium; and silyloxy, such as trimethylsilyloxy.

If desired, the substituents may themselves be further substituted one or more times with the described substituent groups. The particular substituents used may be selected by those skilled in the art to attain the desired desirable properties for a specific application and can include, for example, electron-withdrawing groups, electron-donating groups, and steric groups. When a molecule may have two or more substituents, the substituents may be joined together to form a ring such as a fused ring unless otherwise provided. Generally, the above groups and substituents thereof may include those having up to 48 carbon atoms, typically 1 to 36 carbon atoms and usually less than 24 carbon atoms, but greater numbers are possible depending on the particular substituents selected. Substitution can include fused ring derivatives such as, but not limited to benzo-, dibenzo-, naphtha-, or dinaphtho-fused derivatives. These fused ring derivatives can be further substituted as well.

The emissive material, or periodic gain region(s) 100, can be comprised of a single host material, but more commonly consists of a host material doped with a guest compound (dopant) or compounds where light emission comes primarily from the dopant and can be of any color. These host-dopant combinations are advantageous since they result in very small unpumped scattering/absorption losses for the gain media (can be less than 1 cm$^{-1}$). The dopant is usually chosen from highly fluorescent dyes, but phosphorescent compounds, e.g., transition metal complexes as described for OLED applications in WO 98/55561, WO 00/18851, WO 00/57676, and WO 00/70655 are also useful. Dopants are typically coated as 0.01 to 10% by weight into the host material, wherein they can be selected to provide emitted light having hues of either red, green, or blue. An example of a useful host-dopant combination for red emitting layers is Alq [aluminum tris(8-hydroxyquinoline)] as the host material and 1% L39 [4-(dicyanomethylene)-2-t-butyl-6-(1,1,7,7-tetramethyljulolidyl-9-enyl)-4H-pyran] as the dopant.

An important relationship for choosing a dye as a dopant is a comparison of the absorption of the dopant material and emission of the host material. For efficient energy transfer (via Forster energy transfer) from the host to the dopant molecule, a necessary condition is that the absorption of the dopant overlaps the emission of the host material. Those skilled in the art are familiar with the concept of Forster energy transfer, which involves a radiationless transfer of energy between the host and dopant molecules. An important relationship for choosing the host material is that the absorption of the host material significantly overlaps the emission spectrum of the pump-beam 60 light. In addition it is preferred that the absorption of the host material or a host material plus a dopant is small at the laser emission wavelength of the device 10. An acceptable level of absorption is that the absorption coefficient of the host plus dopant combination is less than 10 cm$^{-1}$ at the wavelength of the laser emission.

Useful fluorescent emissive materials includes polycyclic aromatic compounds as described in I. B. Berlman, "Handbook of Fluorescence Spectra of Aromatic Molecules," Academic Press, New York, 1971 and EP 1 009 041. Tertiary aromatic amines with more than two amine groups may be used including oligomeric materials.

Another class of useful emissive materials (for host or dopants) include aromatic tertiary amines, where the latter is understood to be a compound containing at least one trivalent nitrogen atom that is bonded only to carbon atoms, at least one of which is a member of an aromatic ring. In one form the aromatic tertiary amine can be an arylamine, such as a monoarylamine, diarylamine, triarylamine, or an oligomeric arylamine. Exemplary monomeric triarylamines are illustrated by Klupfel et al. U.S. Pat. No. 3,180,730. Other suitable triarylamines substituted with one or more vinyl radicals and/or comprising at least one active hydrogen containing group are disclosed by Brantley et al. U.S. Pat. Nos. 3,567,450 and 3,658,520.

A more preferred class of aromatic tertiary amines are those which include at least two aromatic tertiary amine moieties as described in U.S. Pat. Nos. 4,720,432 and 5,061,569. Such compounds include those represented by structural Formula (A).

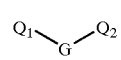

A wherein $Q_1$ and $Q_2$ are independently selected aromatic tertiary amine moieties and G is a linking group such as an arylene, cycloalkylene, or alkylene group of a carbon to carbon bond. In one embodiment, at least one of $Q_1$ or $Q_2$ contains a polycyclic fused ring structure, e.g., a naphthalene. When G is an aryl group, it is conveniently a phenylene, biphenylene, or naphthalene moiety.

A useful class of triarylamines satisfying structural Formula (A) and containing two triarylamine moieties is represented by structural Formula (B):

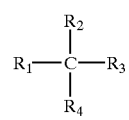

B where:
$R_1$ and $R_2$ each independently represents a hydrogen atom, an aryl group, or an alkyl group or $R_1$ and $R_2$ together represent the atoms completing a cycloalkyl group; and R₃ and R₄ each independently represents an aryl group, which is in turn substituted with a diaryl substituted amino group, as indicated by structural Formula (C):

C wherein R₅ and R₆ are independently selected aryl groups. In one embodiment, at least one of R₅ or R₆ contains a polycyclic fused ring structure, e.g., a naphthalene.

The host material can comprise a substituted or unsubstituted triarylamine compound. Another class of aromatic tertiary amines is the tetraaryldiamines. Desirable tetraaryldiamines include two diarylamino groups, such as indicated by Formula (C), linked through an arylene group. Useful tetraaryldiamines include those represented by Formula (D):

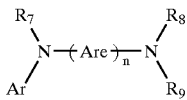

D wherein:
each Are group is an independently selected arylene group, such as a phenylene or anthracene moiety;
n is an integer of from 1 to 4; and
Ar, R₇, R₈, and R₉ are independently selected aryl groups. In a typical embodiment, at least one of Ar, R₇, R₈, and R₉ is a polycyclic fused ring structure, e.g., a naphthalene.

The various alkyl, alkylene, aryl, and arylene moieties of the foregoing structural Formulae (A), (B), (C), (D), can each in turn be substituted. Typical substituents include alkyl groups, alkoxy groups, aryl groups, aryloxy groups, and halogen such as fluoride, chloride, and bromide. The various alkyl and alkylene moieties typically contain from about 1 to 6 carbon atoms. The cycloalkyl moieties can contain from 3 to about 10 carbon atoms, but typically contain five, six, or seven ring carbon atoms—e.g., cyclopentyl, cyclohexyl, and cycloheptyl ring structures. The aryl and arylene moieties are usually phenyl and phenylene moieties.

The emissive material can be formed of a single or a mixture of aromatic tertiary amine compounds. Specifically, one may employ a triarylamine, such as a triarylamine satisfying the Formula (B), in combination with a tetraaryldiamine, such as indicated by Formula (D). When a triarylamine is employed in combination with a tetraaryldiamine, the latter is positioned as a layer interposed between the triarylamine and the electron injecting and transporting layer. The host material can include a substituted or unsubstituted dicarbazole-biphenyl compound. Illustrative of useful aromatic tertiary amines is the following:

4,4'-N,N'-dicarbazole-1,1'-biphenyl (CBP) (D1)
4,4'-Bis[N-(1-naphthyl)-N-phenylamino]biphenyl (D2)
4,4'-Bis[N-(1-naphthyl)-N-(2-naphthyl)amino]biphenyl (D3)
4,4'-Bis[N-(2-naphthyl)-N-p-tolylamino]biphenyl (D4)
1,1-Bis(4-di-p-tolylaminophenyl)cyclohexane
1,1-Bis(4-di-p-tolylaminophenyl)-4-phenylcyclohexane
4,4'-Bis(diphenylamino)quadriphenyl
Bis(4-dimethylamino-2-methylphenyl)-phenylmethane
N,N,N-Tri(p-tolyl)amine
4-(di-p-tolylamino)-4'-[4(di-p-tolylamino)-styryl]stilbene
N,N,N',N'-Tetra-p-tolyl-4-4'-diaminobiphenyl
N,N,N',N'-Tetraphenyl-4,4'-diaminobiphenyl
N,N,N',N'-tetra-1-naphthyl-4,4'-diaminobiphenyl
N,N,N',N'-tetra-2-naphthyl-4,4'-diaminobiphenyl
N-Phenylcarbazole
4,4"-Bis[N-(1-naphthyl)-N-phenylamino]p-terphenyl
4,4'-Bis[N-(2-naphthyl)-N-phenylamino]biphenyl
4,4'-Bis[N-(3-acenaphthenyl)-N-phenylamino]biphenyl
1,5-Bis[N-(1-naphthyl)-N-phenylamino]naphthalene
4,4'-Bis[N-(9-anthryl)-N-phenylamino]biphenyl
4,4"-Bis[N-(1-anthryl)-N-phenylamino]-p-terphenyl
4,4'-Bis[N-(2-phenanthryl)-N-phenylamino]biphenyl
4,4'-Bis[N-(8-fluoranthenyl)-N-phenylamino]biphenyl
4,4'-Bis[N-(2-pyrenyl)-N-phenylamino]biphenyl
4,4'-Bis[N-(2-naphthacenyl)-N-phenylamino]biphenyl
4,4'-Bis[N-(2-perylenyl)-N-phenylamino]biphenyl
4,4'-Bis[N-(1-coronenyl)-N-phenylamino]biphenyl
2,6-Bis(di-p-tolylamino)naphthalene
2,6-Bis[di-(1-naphthyl)amino]naphthalene
2,6-Bis[N-(1-naphthyl)-N-(2-naphthyl)amino]naphthalene
N,N,N',N'-Tetra(2-naphthyl)-4,4"-diamino-p-terphenyl
4,4'-Bis{N-phenyl-N-[4-(1-naphthyl)-phenyl]amino}biphenyl
4,4'-Bis[N-phenyl-N-(2-pyrenyl)amino]biphenyl
2,6-Bis[N,N-di(2-naphthyl)amine]fluorene
1,5-Bis[N-(1-naphthyl)-N-phenylamino]naphthalene
4,4',4"-tris[(3-methylphenyl)phenylamino]triphenylamine.

The host material can comprise a substituted or unsubstituted aza-aromatic compound. For example, the host material can comprise a substituted or unsubstituted acridine, quinoline, purine, phenazine, phenoxazine, or phenanthroline compound. Carbazole derivatives are useful hosts. Useful examples of phenanthroline materials include 2,9-dimethyl-4,7-diphenyl-1,10-phenanthroline and 4,7-diphenyl-1,10-phenanthroline.

Host and dopant molecules include, but are not limited to, those disclosed in U.S. Pat. Nos. 4,768,292; 5,141,671; 5,150,006; 5,151,629; 5,405,709; 5,484,922; 5,593,788; 5,645,948; 5,683,823; 5,755,999; 5,928,802; 5,935,720; 5,935,721; and 6,020,078.

Metal complexes of 8-hydroxyquinoline and similar derivatives (Formula E) constitute one class of useful host compounds capable of supporting electroluminescence, and are particularly suitable for light emission of wavelengths longer than 500 nm, e.g., green, yellow, orange, and red.

E

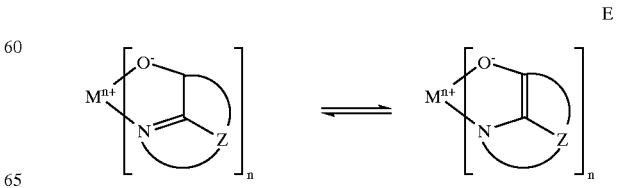

wherein

M represents a metal;

n is an integer of from 1 to 4; and

Z independently in each occurrence represents the atoms completing a nucleus having at least two fused aromatic rings.

From the foregoing it is apparent that the metal can be monovalent, divalent, trivalent, or tetravalent metal. The metal can, for example, be an alkali metal, such as lithium, sodium, or potassium; an alkaline earth metal, such as magnesium or calcium; an earth metal, such aluminum or gallium, or a transition metal such as zinc or zirconium. Generally any monovalent, divalent, trivalent, or tetravalent metal known to be a useful chelating metal can be employed.

Z completes a heterocyclic nucleus containing at least two fused aromatic rings, at least one of which is an azole or azine ring. Additional rings, including both aliphatic and aromatic rings, can be fused with the two required rings, if required. To avoid adding molecular bulk without improving on function the number of ring atoms is usually maintained at 18 or less.

The host material can comprise a substituted or unsubstituted chelated oxinoid compound.

Illustrative of useful chelated oxinoid compounds are the following:

CO-1: Aluminum trisoxine [alias, tris(8-quinolinolato) aluminum(III)]

CO-2: Magnesium bisoxine [alias, bis(8-quinolinolato) magnesium(II)]

CO-3: Bis[benzo{f}-8-quinolinolato]zinc (II)

CO-4: Bis(2-methyl-8-quinolinolato)aluminum(III)-μ-oxo-bis(2-methyl-8-quinolinolato)aluminum(III)

CO-5: Indium trisoxine [alias, tris(8-quinolinolato) indium]

CO-6: Aluminum tris(5-methyloxine) [alias, tris(5-methyl-8-quinolinolato)aluminum(III)]

CO-7: Lithium oxine [alias, (8-quinolinolato)lithium(I)]

CO-8: Gallium oxine [alias, tris(8-quinolinolato)gallium (III)]

CO-9: Zirconium oxine [alias, tetra(8-quinolinolato) zirconium(IV)]

The host material can include a substituted or unsubstituted anthracene compound.

Derivatives of 9,10-di-(2-naphthyl)anthracene (Formula F) constitute one class of useful hosts capable of supporting photoluminescence, and are particularly suitable for light emission of wavelengths longer than 400 nm, e.g., blue, green, yellow, orange or red.

F

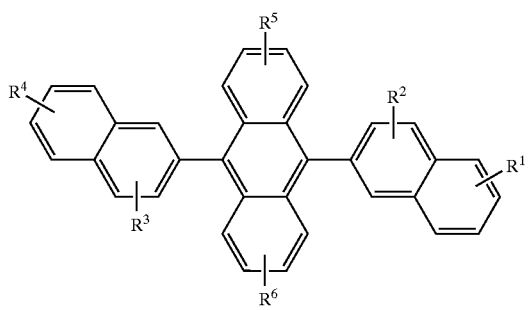

wherein $R^1$, $R^2$, $R^3$, $R^4$, $R^5$, and $R^6$ represent one or more substituents on each ring where each substituent is individually selected from the following groups:

Group 1: hydrogen, or alkyl of from 1 to 24 carbon atoms;

Group 2: aryl or substituted aryl of from 5 to 20 carbon atoms;

Group 3: carbon atoms from 4 to 24 necessary to complete a fused aromatic ring of anthracenyl; pyrenyl, or perylenyl;

Group 4: heteroaryl or substituted heteroaryl of from 5 to 24 carbon atoms as necessary to complete a fused heteroaromatic ring of furyl, thienyl, pyridyl, quinolinyl or other heterocyclic systems;

Group 5: alkoxylamino, alkylamino, or arylamino of from 1 to 24 carbon atoms; and Group 6: fluorine, chlorine, bromine or cyano.

Illustrative examples include 9,10-di-(2-naphthyl) anthracene (F1) and 2-t-butyl-9,10-di-(2-naphthyl) anthracene (F2). Other anthracene derivatives can be useful as a host, including derivatives of 9,10-bis-(4-(2,2'-diphenylethenyl)phenyl)anthracene.

Benzazole derivatives (Formula G) constitute another class of useful hosts capable of supporting photoluminescence, and are particularly suitable for light emission of wavelengths longer than 400 nm, e.g., blue, green, yellow, orange or red.

G

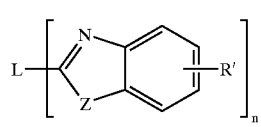

where:

where n is an integer of 3 to 8;

Z is O, NR or S; and

R and R' are individually hydrogen; alkyl of from 1 to 24 carbon atoms, for example, propyl, t-butyl, heptyl, and the like; aryl or hetero-atom substituted aryl of from 5 to 20 carbon atoms for example phenyl and naphthyl, furyl, thienyl, pyridyl, quinolinyl and other heterocyclic systems; or halo such as chloro, fluoro; or atoms necessary to complete a fused aromatic ring; and L is a linkage unit consisting of alkyl, aryl, substituted alkyl, or substituted aryl, which conjugately or unconjugately connects the multiple benzazoles together. An example of a useful benzazole is 2,2',2"-(1,3,5-phenylene) tris[1-phenyl-1H-benzimidazole].

The host material can comprise a substituted or unsubstituted benzoxazole compound, a substituted or unsubstituted benzthiazole compound, or a substituted or unsubstituted benzimidazole compound. The host material can comprise a substituted or unsubstituted oxazole compound, a substituted or unsubstituted triazole compound, or a substituted or unsubstituted oxadiazole compound. Useful examples of oxazole compounds include 1,4-bis(5-phenyloxazol-2-yl)benzene, 1,4-bis(4-methyl-5-phenyloxazol-2-yl)benzene, and 1,4-bis(5-(p-biphenyl) oxazol-2-yl)benzene. Useful examples of oxadiazole compounds include 2-(4-biphenylyl)-5-phenyl-1,3,4-oxadiazole and 2-(4-biphenylyl)-5-(4-tert-butylphenyl)-1,3, 4-oxadiazole. Useful examples of triazole compounds include 3-(4-biphenylyl)-4-phenyl-5-tert-butylphenyl-1,2,4-triazole.

Distyrylarylene derivatives are also useful as host materials or dopant materials, many examples are described in U.S. Pat. No. 5,121,029. Useful emissive materials (hosts and dopants) can have the general Formulae (H) or (I):

X—CH=CH—Y—CH=CH-Z  (H)

X—(CH=CH)$_n$-Z  (I)

where:
- X and Z are independently a substituted or unsubstituted aromatic group or a substituted or unsubstituted aromatic complex ring group having one nitrogen atom;
- n equals 1, 2, or 3; and
- Y is a divalent aromatic group or a divalent aromatic complex ring group having one nitrogen atom. Useful examples include 1,4-bis(2-methylstyryl)benzene, 4,4'-(9,10-anthracenediyldi-2,1-ethenediyl)bis(N,N-bis(4-methylphenyl)benzenamine, 4,4'-(1,4-naphthalenediyldi-2,1-ethenediyl)bis(N,N-bis(4-methylphenyl)benzenamine, and 4,4'-(1,4-phenylenedi-2,1-ethenediyl)bis(N,N-(4-tolyl)) benzeneamine.

The dopant is selected to provide emission between 300–1700 nm. The dopant can be selected from fluorescent or phosphorescent dyes. Useful fluorescent dopants include materials as described as host materials above. Other useful fluorescent dopants include, but are not limited to, derivatives of substituted or unsubstituted anthracene, tetracene, xanthene, perylene, rubrene, coumarin, rhodamine, and quinacridone, dicyanomethylenepyran compounds, thiopyran compounds, polymethine compounds, pyrilium and thiapyrilium compounds, fluorene derivatives, periflanthene derivatives, indenoperylene derivatives, bis(azinyl)amine boron compounds, bis(azinyl)methane compounds, napthyridine, fluoranthene, furan, indole, thiaphene, benzoxanthene, pyrene, peropyrene, terphenyl, quaterphenyl, quinquephenyl, sexiphenyl, anthanthrene, bisanthrene compounds, N,N,N',N'-tetrasubstituted benzidene derivatives, N,N,N',N'-tetrarylbenzidene derivatives and carbostyryl compounds or combinations thereof. Derivatives of these classes of materials can also serve as useful host materials or combinations thereof. Host materials will often be compounds containing at least three phenylene moieties.

Illustrative examples of useful dopants include, but are not limited to, the following:

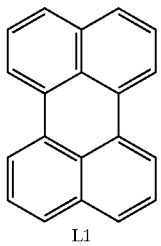
L1

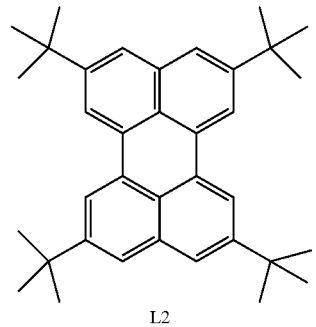
L2

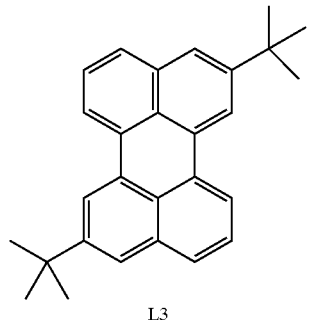
L3

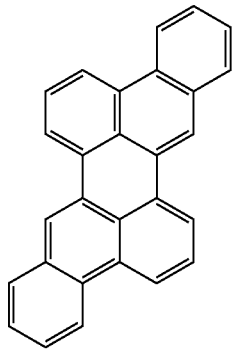
L4

-continued
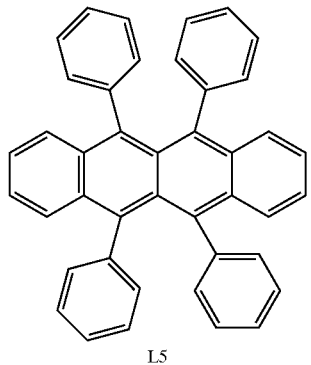
L5
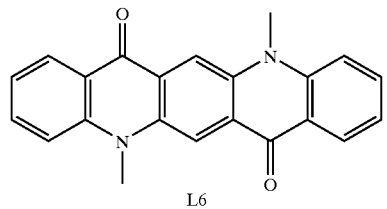
L6
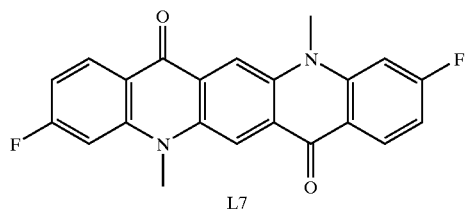
L7
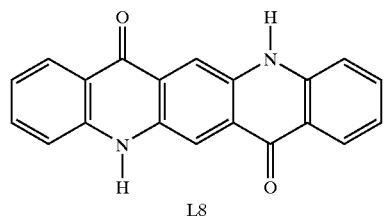
L8
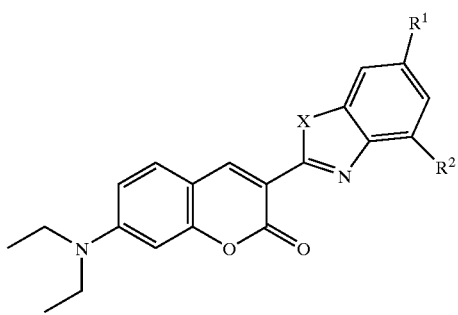
| | X | R1 | R2 |
|---|---|---|---|
| L9 | O | H | H |
| L10 | O | H | Methyl |
| L11 | O | Methyl | H |
| L12 | O | Methyl | Methyl |
| L13 | O | H | t-butyl |
| L14 | O | t-butyl | H |
| L15 | O | t-butyl | t-butyl |
| L16 | S | H | H |
| L17 | S | H | Methyl |
| L18 | S | Methyl | H |
| L19 | S | Methyl | Methyl |
| L20 | S | H | t-butyl |
| L21 | S | t-butyl | H |
| L22 | S | t-butyl | t-butyl |
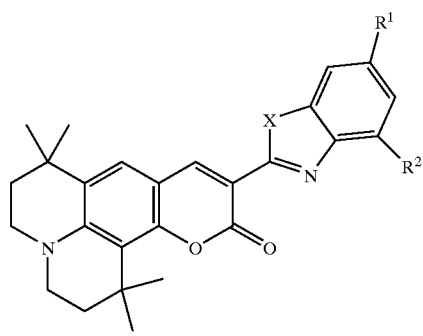
| | X | R1 | R2 |
|---|---|---|---|
| L23 | O | H | H |
| L24 | O | H | Methyl |
| L25 | O | Methyl | H |
| L26 | O | Methyl | Methyl |
| L27 | O | H | t-butyl |
| L28 | O | t-butyl | H |
| L29 | O | t-butyl | t-butyl |
| L30 | S | H | H |
| L31 | S | H | Methyl |
| L32 | S | Methyl | H |
| L33 | S | Methyl | Methyl |
| L34 | S | H | t-butyl |
| L35 | S | t-butyl | H |
| L36 | S | t-butyl | t-butyl |

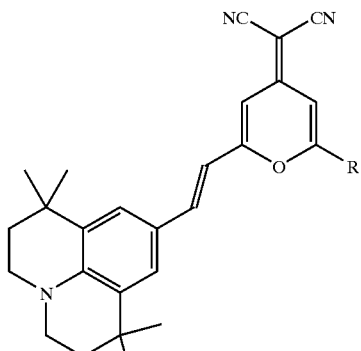
| | R |
|---|---|
| L37 | phenyl |
| L38 | methyl |
| L39 | t-butyl |
| L40 | mesityl |
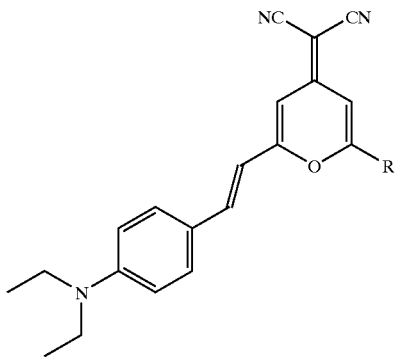
| | R |
|---|---|
| L41 | phenyl |
| L42 | methyl |
| L43 | t-butyl |
| L44 | mesityl |
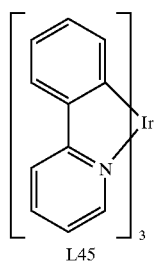
L45
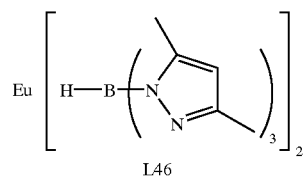
L46
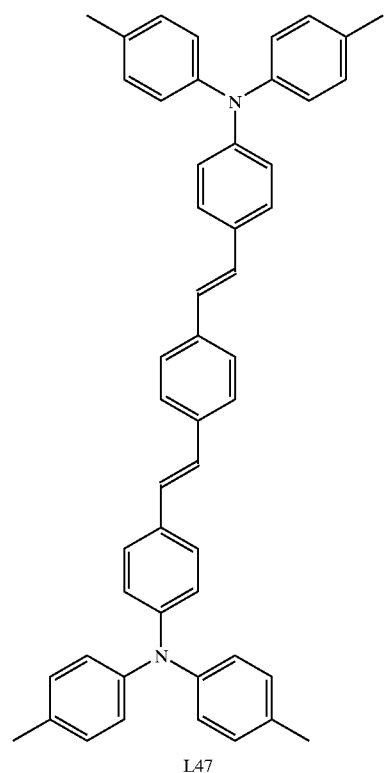
L47
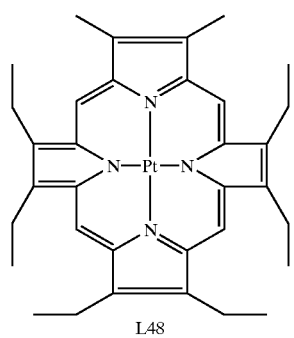
L48

-continued
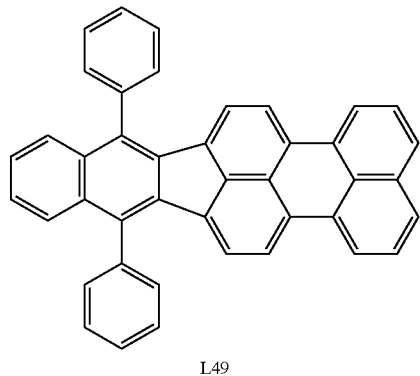
L49
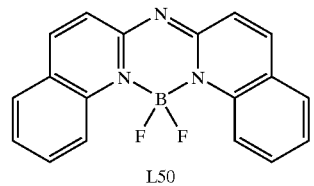
L50
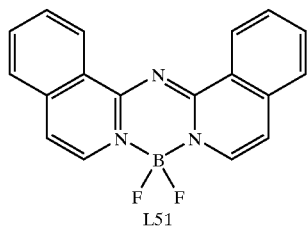
L51
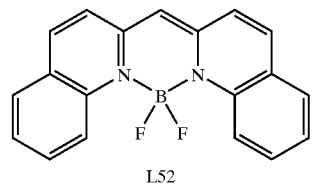
L52
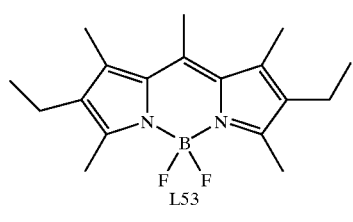
L53
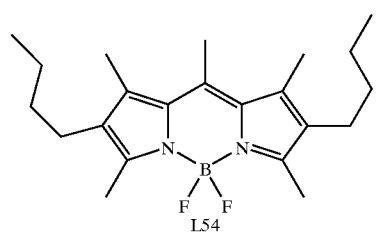
L54
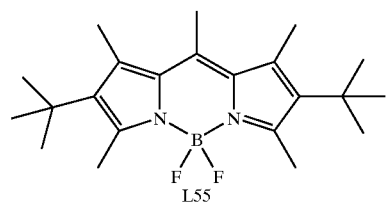
L55
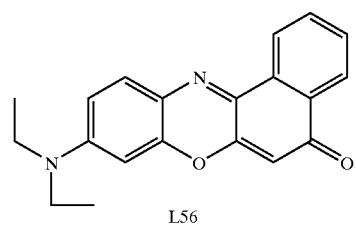
L56
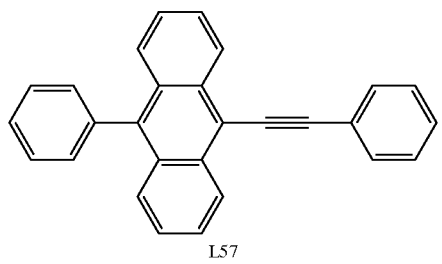
L57
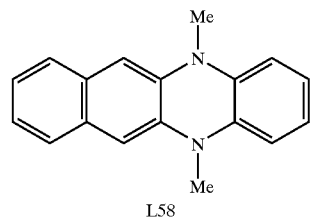
L58

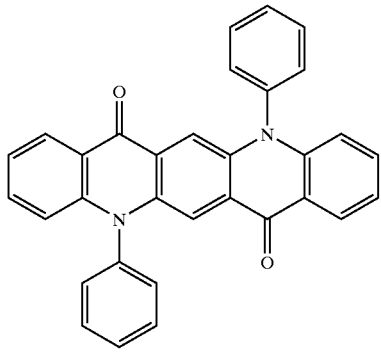

L59

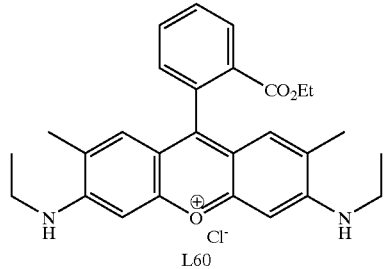

L60

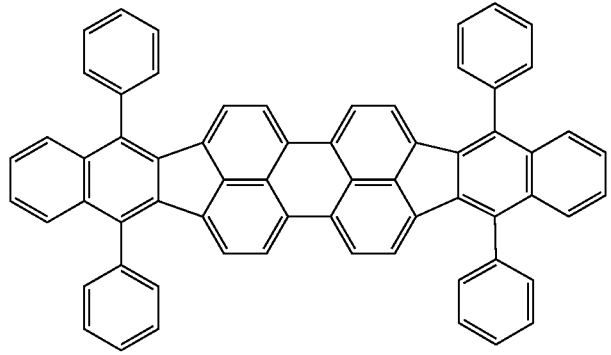

L61

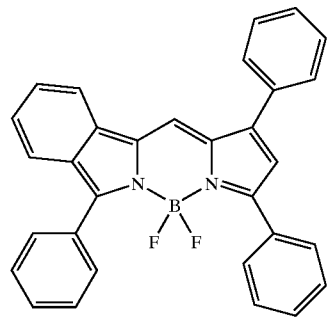

L62

Other emissive materials include various heterocyclic optical brighteners as described in U.S. Pat. No. 4,539,507.

The emissive material can also be a polymeric material, a blend of two or more polymeric materials, or a doped polymer or polymer blend. The emissive material can also be a combination of more than one nonpolymeric and polymeric materials with or without dopants. Typical dopants are listed previously for nonpolymeric molecules. Nonpolymeric dopants can be molecularly dispersed into the polymeric host, or the dopant could be added by copolymerizing a minor constituent into the host polymer. Typical polymeric materials include, but are not limited to, substituted and unsubstituted poly(p-phenylenevinylene) (PPV) derivatives, substituted and unsubstituted poly(p-phenylene) (PPP) derivatives, substituted and unsubstituted polyfluorene (PF) derivatives, substituted and unsubstituted poly(p-pyridine), substituted and unsubstituted poly(p-pyridalvinylene) derivatives, and substituted, unsubstituted poly(p-phenylene) ladder and step-ladder polymers, and copolymers thereof as taught by Diaz-Garcia et al. in U.S. Pat. No. 5,881,083 and references therein. The substituents include but are not limited to alkyls, cycloalkyls, alkenyls, aryls, heteroaryls, alkoxy, aryloxys, amino, nitro, thio, halo, hydroxy, and cyano. Typical polymers are poly(p-phenylene vinylene), dialkyl-, diaryl-, diamino-, or dialkoxy-substituted PPV, mono alkyl-mono alkoxy-substituted PPV, mono aryl-substituted PPV, 9,9'-dialkyl or diaryl-substituted PF, 9,9'-mono alky-mono aryl substituted PF, 9-mono alky or aryl substituted PF, PPP, dialkyl-, diamino-, diaryl-, or dialkoxy-substituted PPP, mono alkyl-, aryl-, alkoxy-, or amino-substituted PPP. In addition, polymeric materials can be used such as poly(N-vinylcarbazole) (PVK), polythiophenes, polypyrrole, polyaniline, and copolymers such as poly(3,4-ethylenedioxythiophene)/poly(4-styrenesulfonate) also called PEDOT/PSS.

Useful spacer materials are those that have insignificant absorption at or above the emission of the pump-beam 60 light. Besides 1,1-Bis-(4-bis(4-methyl-phenyl)-amino-phenyl)-cyclohexane (TAPC) previously mentioned, other useful materials include 1,2,3,4-tetraphenylnaphthalene, mono-, 1,3-di-, 1,3,5-tri-, and 1,3,5,7-tetraaryladamantanes, tetraarylmethanes and triptycenes or combinations thereof.

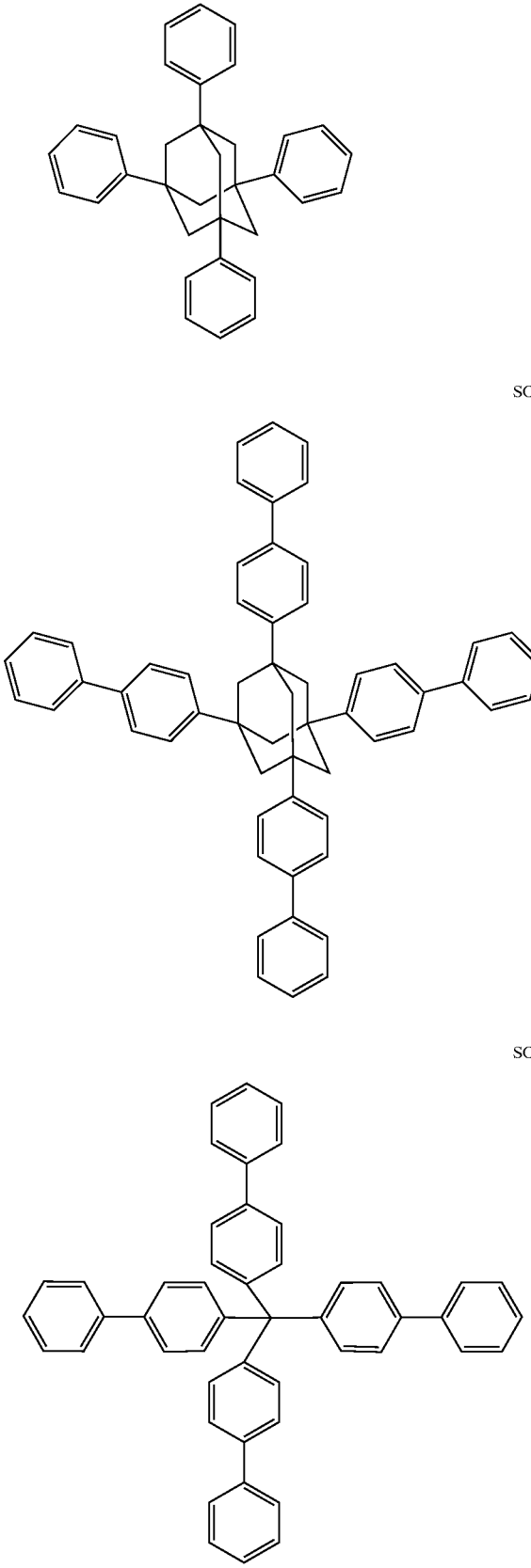

SO1

SO2

SO3

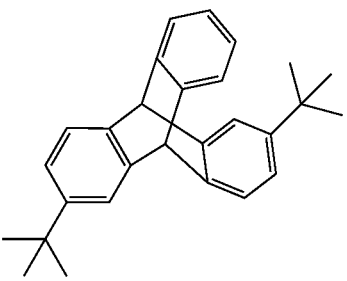

SO4

The spacer material can also include substituted or unsubstituted 1,2,3,4-tetraphenylnaphthalene, 1,3,5-tri(3,5-dimethylphenyl)adamantane, 1,3,5,7-tetra(4-biphenyl) adamantane, 1,1-Bis-(4-bis(4-methyl-phenyl)-aminophenyl)-cyclohexane, tetra(4-biphenyl)methane, or 2-t-butyl-9,10-o-benzeno-9,10-dihydroanthracene or combinations thereof.

The organic materials mentioned above are suitably deposited through sublimation, but can be deposited from a solvent with an optional binder to improve film formation. If the material is a polymer, solvent deposition is usually preferred. The material to be deposited by sublimation can be vaporized from a sublimator "boat" often comprised of a tantalum material, e.g., as described in U.S. Pat. No. 6,237,529, or can be first coated onto a donor sheet and then sublimed in closer proximity to the substrate. Layers with a mixture of materials can utilize separate sublimator boats or the materials can be pre-mixed and coated from a single boat or donor sheet. Patterned deposition can be achieved using shadow masks, integral shadow masks (U.S. Pat. No. 5,294,870), spatially-defined thermal dye transfer from a donor sheet (U.S. Pat. Nos. 5,688,551; 5,851,709; and 6,066,357) and inkjet method (U.S. Pat. No. 6,066,357).

Most organic laser devices are sensitive to moisture or oxygen, or both, so they are commonly sealed in an inert atmosphere such as nitrogen or argon. Desiccant such as alumina, bauxite, calcium sulfate, clays, silica gel, zeolites, alkaline metal oxides, alkaline earth metal oxides, sulfates, or metal halides and perchlorates can be incorporated into the sealed device. Methods for encapsulation and desiccation include, but are not limited to, those described in U.S. Pat. No. 6,226,890. In addition, barrier layers such as $SiO_x$, Teflon, and alternating inorganic/polymeric layers are known in the art for encapsulation.

The entire contents of the patents and other publications referred to in this specification are incorporated herein by reference.

The following examples are presented for further understanding of the present invention and is not to be construed as limitations thereon.

EXAMPLE 1

Solution Ultaviolet (UV) absorption spectra and fluorescent emission spectra of materials demonstrate useful dopant and host materials. The solution UV absorption spectra and fluorescent emission spectra of representative materials are given in FIGS. 3–46. All solution spectra are from ethyl acetate solutions with the exception of L59 (THF), L60 (water) and L62 (sucrose octaacetate).

The Table indicates overlap of the emission of the host material with the absorbance of the dopant materials. An "X" indicates at least 5% host emission relative to local emission maximum at a wavelength that has at least 5% dopant absorbance relative to local absorbance maximum. A "0" indicates no (or less) overlap.

TABLE

| | Hosts: | | | | | |
|---|---|---|---|---|---|---|
| | F2 | CO1 | DPPA | D1 | D4 | D2 |
| Dopants: | X | X | X | X | X | X |
| L56 | X | X | X | X | X | X |
| L2 | X | X | X | X | X | X |
| L5 | X | X | 0 | 0 | X | X |
| L60 | X | X | X | X | X | X |
| L1 | X | X | X | X | X | X |
| L50 | X | 0 | X | X | X | X |
| L52 | X | X | X | X | X | X |
| L58 | X | 0 | X | X | X | X |
| L39 | X | X | X | X | X | X |
| L30 | X | X | X | X | X | X |
| L57 | X | X | X | X | X | X |
| L47 | X | X | X | X | X | X |
| L59 | X | X | X | X | X | X |
| L61 | X | X | X | X | X | X |
| L62 | X | X | X | X | X | X |
| F2 | na | 0 | X | X | X | X |

Clearly there are numerous combinations of host and dopant materials where the emission of the host material overlaps the absorption of the dopant material. As earlier stated, materials may be useful as both host and dopant materials. As example, the emissive material F2 is demonstrated to have appropriate absorption and emission to act as either a host (for all the other dopants listed in the Table) or a dopant material (with all the other host materials listed in the Table except CO1).

EXAMPLE 2

To test the devices for both their spectral and power characteristics, an organic vertical cavity laser structure 10 was deposited on a 4-inch silicon substrate. Over the substrate was deposited, by conventional electron beam deposition, the bottom dielectric stack 30, which was composed of alternating low and high refractive index layers of SiO2 and $TiO_2$, respectively. The bottom dielectric stack had a peak reflectance of ~99.95% at 660 nm. On top of the bottom dielectric stack was deposited, by high-vacuum thermal evaporation, the active region 40. The composition of the active region was 190 nm of TAPC, 20 nm of Alq plus a dopant, and 188 nm of TAPC. In one example, the dopant was L39 at a concentration of 1%; while, for the other case the dopant was L62 at a concentration of 0.5%. Following the active region 40 was deposited the top dielectric stack 50 composed of alternating layers of $SiO_2$ and $TiO_2$, such that its resulting measured peak reflectance was 99.85% at 660 nm. The top dielectric stack was deposited by electron-beam deposition at an average substrate temperature of 72° C.

The pump-beam 60 was the 404 nm output from a 5 mW Nichia laser diode and was directed onto the top dielectric stack at approximately 30° from the normal. The pump laser produced 50 nsec laser pulses at a variable repetition rate (from 5 KHz to 5 MHz). The pump-beam intensity was adjusted by the combination of two neutral density wheels, and it was focused on the laser cavity surface using an objective lens with a 125 mm focal length. Through the use of a near-field camera system focused on the top surface of the device, a spot size of ~20×29 µm was measured. The laser emission 70 from the cavity was focused on the entrance slit of a Spex double monochrometer (0.22 m) by the combination of a 50 mm f2 lens and a 100 mm f4 lens nearest the slit (resulting in a 2× magnification of the laser's near-field image). The resolution of the monochrometer is approximately 0.45 nm; its output was detected by a cooled Hamamatsu photomultiplier tube.

At a pump-beam 60 power density on the device surface of ~10 $W/cm^2$ (above the lasing threshold), the measured spectral and intensity characteristics for the two cases are given in the table below. The spectral linewidth corresponds to the full-width at half maximum (FWHM) of the laser peaks.

| Active Region dopant | Intensity (5 KHz) | Linewidth (5 KHz) | Emission wavelength (5 KHz) | Intensity (5 MHz) |
|---|---|---|---|---|
| 1% L39 | 494 | 1.9 nm | 696 nm | 296,400 |
| 0.5% L62 | 776 | 1.9 nm | 700 nm | 620,900 |

As can be seen from the table, the device containing the L62 dopant produced a more intense laser peak at 5 KHz. In addition, its laser intensity was less affected by increasing the pump-beam repetition rate to 5 Mhz. As a result, it is less sensitive to spectral broadening due to thermooptic effects.

EXAMPLE 3

In this example, a comparison was made for laser devices containing green dopants. The device structure was analogous to that of Example 2, except the thicknesses of the active region layers were 137 nm of TAPC, 50 nm of Alq plus a dopant, and 122 nm of TAPC. The four dopants for this example are 0.5% of L30, 0.75% of L55, 0.75% of L54, and 0.75% of L53. The bottom dielectric stack 30 had a peak reflectance of ~99.98% at 560 nm, while the top dielectric stack 50 had a peak reflectance of ~99.3% at 560 nm. At a pump-beam power density on the device surface of ~10 $W/cm^2$, the measured spectral and intensity characteristics for the four cases are given in the table below.

| Active Region dopant | Intensity (5 KHz) | Linewidth (5 KHz) | Emission wavelength (5 KHz) | Intensity (5 MHz) |
|---|---|---|---|---|
| 0.5% L30 | 5186 | 1.3 nm | 562 nm | $51 \times 10^5$ |
| 0.75% L55 | 3522 | 1.2 nm | 567 nm | $30 \times 10^5$ |
| 0.75% L54 | 5100 | 1.4 nm | 557 nm | $41 \times 10^5$ |
| 0.75% L53 | 4400 | 1.1 nm | 562 nm | $37 \times 10^5$ |

As can be seen from the table, the device containing the L30 dopant produced the most intense laser peak at 5 KHz. In addition, its laser intensity was least affected by increasing the pump-beam repetition rate to 5 Mhz. As a result, at least with regard to the above laser properties, L30 was more suited as a dopant in laser devices in comparison to typical pyromethene dopants.

EXAMPLE 4

In this example, a comparison was made for laser devices containing the same dopant (L30) but different hosts, Alq and F2 (TBADN). The device structure was analogous to that of Example 3, except the thicknesses of the active region layers were 150 nm of TAPC, 25 nm of the host plus 0.5% of L30, and 134 nm of TAPC. For this example, the spot size of the pump-beam 60 on the device surface was 160×232 μm, as a result of using a 1000 mm lens to focus the pump-beam 60. At a pump-beam power density on the device surface of ~0.3 W/cm², the measured spectral and intensity characteristics for the two cases are given in the table below.

| Active Region hosts | Intensity (5 KHz) | Linewidth (5 KHz) | Emission wavelength (5 KHz) |
|---|---|---|---|
| Alq | 1726 | 1.8 nm | 551 nm |
| TBADN | 2203 | 1.8 nm | 551 nm |

As can be seen from the above table, the lasing intensity is 28% greater when using TBADN as the host material. This increase can be mainly attributed to the increased absorption (~40% at 405 nm) of the pump-beam 60 by TBADN relative to that of Alq.

The invention has been described in detail with particular reference to certain preferred embodiments thereof, but it will be understood that variations and modifications can be effected within the spirit and scope of the invention.

Parts List 10 vertical cavity organic laser device
20 substrate
30 bottom dielectric stack
40 organic active region
50 top dielectric stack
60 pump-beam
70 laser emission
100 periodic gain regions
110 spacer layers
120 standing electromagnetic field pattern

What is claimed is:

1. An organic vertical cavity laser light producing device, comprising:
    a) a bottom dielectric stack reflective to light over a predetermined range of wavelengths;
    b) an organic active layer for producing laser light, comprising an emissive material that has a host material;
    c) a top dielectric stack spaced from the bottom dielectric stack and reflective to light over a predetermined range of wavelengths;
    d) an external pump-beam light structure for producing light that is transmitted and introduced into the organic active region through at least one of the dielectric stacks wherein the absorption of the host material significantly overlaps the emission spectrum of the pump-beam light; and
    e) the organic active layer is positioned between the bottom and top dielectric stacks and includes one or more periodic gain layers and organic spacer layers disposed on either side of the periodic gain layer(s) and arranged so that the periodic gain layer(s) is aligned with the antinodes of the device's standing wave electromagnetic field, and wherein the spacer layers are substantially transparent to the laser light.

2. The device of claim 1 wherein the emissive material includes a dopant.

3. The device of claim 2 wherein the absorption of the host material or the host material and the dopant is small at the laser emission wavelength of the device.

4. The device of claim 2 wherein the emission of the host material significantly overlaps the absorption of the dopant.

5. The device of claim 1 wherein the spacer layers have insignificant absorption at or above the emission of the pump-beam light.

6. The device of claim 1 wherein the spacer layers comprise a compound selected from the group consisting 1,2,3,4-tetraarylnaphthalene, mono-, 1,3-di-, 1,3,5-tri-, or 1,3,5,7-tetraaryladamantane, tetraarylmethane or triptycene compounds, which compounds may be substituted or unsubstituted, and combinations thereof.

7. The device of claim 1 wherein the spacer layers comprise a compound selected from the group consisting of 1,2,3,4-tetraphenylnaphthalene, 1,3,5-tri(3,5-dimethylphenyl)adamantane, 1,3,5,7-tetra(4-biphenyl)adamantane, 1,1-bis-(4-bis(4-methyl-phenyl)-aminophenyl)-cyclohexane, tetra(4-biphenyl)methane, and 2-t-butyl-9,10-o-benzeno-9,10-dihydroanthracene, which compounds may be substituted or unsubstituted, and combinations thereof.

8. The device of claim 1 wherein the host material comprises a fluorescent aromatic compound.

9. The device of claim 1 wherein the host material includes a compound selected from the group consisting of derivatives of tetracene, xanthene, perylene, rubrene, coumarin, rhodamine, quinacridone, dicyanomethylenepyran, thiopyran, polymethine, pyrilium, thiapyrilium, napthyridine, fluoranthene, furan, indole, thiaphene, benzoxanthene, pyrene, peropyrene, terphenyl, quaterphenyl, quinquephenyl, sexiphenyl, fluorene, anthanthrene, bisanthrene, N,N,N',N'-tetrasubstituted benzidene, N,N,N',N'-tetrarylbenzidene, and carbostyryl compounds, which compounds may be substituted or unsubstituted, and combinations thereof.

10. The device of claim 1 wherein the host material comprises a compound selected from the group consisting of a substituted aza-aromatic compound and an unsubstituted aza-aromatic compound.

11. The device of claim 1 wherein the host material comprises a compound selected from the group consisting of acridine, quinoline, purine, phenazine, phenoxazine, and phenanthroline compound, which compound may be substituted or unsubstituted.

12. The device of claim 1 wherein the host material comprises a compound selected from the group consisting of a substituted triarylamine compound and an unsubstituted triarylamine compound.

13. The device of claim 1 wherein the host material comprises a compound selected from the group consisting of chelated oxinoid compound, a dicarbazole-biphenyl compound, and a anthracene compound, which compound may be substituted or unsubstituted.

14. The device of claim 1 wherein the host material comprises a compound containing at least three phenylene moieties.

15. The device of claim 1 wherein the host material comprises a compound selected from the group consisting of a substituted chelated oxinoid compound and an unsubstituted chelated oxinoid compound.

16. The device of claim 1 wherein the host material comprise compound selected from the group consisting of a substituted dicarbazole-biphenyl compound and an unsubstituted dicarbazole-biphenyl compound.

17. The device of claim 16 wherein the host material comprises 4,4'-N,N'-dicarbazole-1,1'-biphenyl (CBP).

18. The device of claim 1 wherein the host material comprises a compound selected form the group of a substituted anthracene compound and unsubstituted anthracene compound.

19. The device of claim 18 wherein the host material comprises 9,10-di-(2-naphthyl)anthracene.

20. The device of claim 18 wherein the host material comprises 2-t-butyl-9,10-di-(2-naphthyl)anthracene.

21. The device of claim 18 wherein the host material comprises 9,10-bis-(4-(2,2'-diphenylethenyl)phenyl) anthracene.

22. The device of claim 1 wherein the host material comprises a compound selected from the group consisting of a substituted benzoxazole compound, an unsubstituted benzoxazole compound, a substituted benzthiazole compound, an unsubstituted benzthiazole compound, a substituted oxazole compound, an unsubstituted oxazole compound, a substituted triazole compound, an unsubstituted triazole compound, a substituted oxadiazole compound, an unsubstituted oxadiazole compound, a substituted benzimidazole compound, and an unsubstituted benzimidazole compound.

23. The device of claim 1 wherein the host material comprises a compound of the formula:

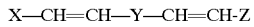

X—CH=CH—Y—CH=CH-Z where X and Z are independently selected from the group consisting of a substituted aromatic group, an unsubstituted aromatic group, a substituted aromatic complex ring group, and an unsubstituted aromatic complex ring group, said aromatic complex ring group having one nitrogen atom, and Y is selected from the group consisting of a divalent aromatic group and a divalent aromatic complex ring group having one nitrogen atom.

24. The device of claim 1 wherein the host material comprises a compound of the formula:

X—(CH=CH)$_n$-Z where X and Z are independently selected from the group consisting of a substituted aromatic group and an unsubstituted aromatic group, a substituted aromatic complex ring group, and an unsubstituted aromatic complex ring group, said aromatic complex ring group having one nitrogen atom, and n equals 1, 2, or 3.

25. The device of claim 2 wherein the dopant material comprises a compound of the formula:

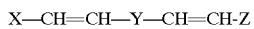

X—CH=CH—Y—CH=CH-Z where X and Z are independently selected from the group consisting of a substituted aromatic group, an unsubstituted aromatic group, a substituted aromatic complex ring group and an unsubstituted aromatic complex ring group, said aromatic complex ring group having one nitrogen atom, and Y is selected from the group consisting of a divalent aromatic group, and a divalent aromatic complex ring group having one nitrogen atom.

26. The device of claim 2 wherein the dopant material comprises a compound of the formula:

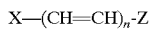

X—(CH=CH)$_n$-Z where X and Z are independently selected from the group consisting of a substituted aromatic group, an unsubstituted aromatic group, a substituted aromatic complex ring group, and an unsubstituted aromatic complex ring group, said aromatic complex ring group having one nitrogen atom, and n equals 1, 2, or 3.

27. The device of claim 2 wherein the dopant material comprises a 4,4'-(1,4-phenylenedi-2,1-ethenediyl)bis(N,N-aryl)arylamine compound.

28. The device of claim 2 wherein the dopant material comprises 4,4'-(9,10-anthracenediyldi-2,1-ethenediyl)bis(N, N-bis(4-methylphenyl)benzenamine.

29. The device of claim 2 wherein the dopant material comprises 4,4'-(1,4-naphthalenediyldi-2,1-ethenediyl)bis(N, N-bis(4-methylphenyl)benzenamine.

30. The device of claim 2 wherein the dopant material comprises 4,4'-(1,4-phenylenedi-2,1-ethenediyl)bis(N,N-(4-tolyl))benzeneamine.

31. The device of claim 2 wherein the dopant comprises a fluorescent aromatic compound.

32. The device of claim 2 wherein the dopant comprises a fluorescent dye.

33. The device of claim 2 wherein the dopant comprises a phosphorescent dye.

34. The device of claim 2 wherein the dopant is selected to provide emission between 300 and 1700 nm.

35. The device of claim 2 wherein the dopant is selected to provide an emitted light having a blue hue.

36. The device of claim 2 wherein the dopant is selected to provide an emitted light having a green hue.

37. The device of claim 2 wherein the dopant is selected to provide an emitted light having a red hue.

38. The device of claim 2 wherein the dopant comprises a fluorescent dye selected from the group sonsisting of anthracene, tetracene, xanthene, perylene, rubrene, coumarin, rhodamine, quinacridone, dicyanomethylenepyran, thiopyran, polymethine, pyrilium, thiapyrilium, napthyridine, fluoranthene, furan, indole, thiaphene, benzoxanthene, pyrene, peropyrene, terphenyl, quaterphenyl, quinquephenyl, sexiphenyl, fluorene, anthanthrene, bisanthrene, N,N,N',N'-substituted benzidene, N,N,N',N'-tetrarylbenzidene, carbostyryl, acridine, quinoline, purine, phenazine, phenoxazine, and phenanthroline compounds, which compounds may be substituted or unsusbstituted.

39. The device of claim 2 wherein the dopant comprises a compound selected form the group consisting of a benzoxazole compound, a benzthiazole compound, an oxazole compound, a triazole compound, an oxadiazole compound and a benzimidazole compound, any of which may be substituted or unsusbstituted.

40. The device of claim 38 wherein the dopant comprises a fluorescent dye including a compound selected from the group consisting of a substituted or unsubstituted benzo-, dibenzo-, naphtha-, and dinaphtho-fused derivatives, and combinations thereof.

41. The device of claim 1 wherein the host material includes a polymeric material.

42. The device of claim 41 wherein the host material is a blend of two or more polymeric materials.

43. The device of claim 1 wherein the host material is a combination of nonpolymeric and polymeric material.

44. The device of claim 42 wherein the polymeric materials are unsubstituted poly(p-phenylenevinylene) derivatives.

45. The device of claim 42 wherein the polymeric materials are substituted and unsubstituted poly(p-phenylene) derivatives.

46. The device of claim 41 wherein the polymeric materials are substituted and unsubstituted polyfluorene derivatives.

47. The device of claim 41 wherein the polymeric materials are substituted and unsubstituted poly(p-pyridine).

48. The device of claim 41 wherein the polymeric materials are substituted and unsubstituted poly(p-pyridalvinylene) derivatives.

49. The device of claim 41 wherein the polymeric materials are substituted and unsubstituted poly(p-phenylene) ladder and step-ladder polymers.

* * * * *